(12) United States Patent
Bosnak et al.

(10) Patent No.: US 11,461,952 B1
(45) Date of Patent: Oct. 4, 2022

(54) SYSTEMS AND METHODS FOR AUTOMATED REAL-TIME GENERATION OF AN INTERACTIVE ATTUNED DISCRETE AVATAR

(71) Applicant: Attune Media Labs, PBC, Sherman Oaks, CA (US)

(72) Inventors: Robert E. Bosnak, Santa Barbara, CA (US); David E. Bosnak, Sherman Oaks, CA (US); Albert Rizzo, Los Angeles, CA (US)

(73) Assignee: Attune Media Labs, PBC, Sherman Oaks (CA)

( * ) Notice: Subject to any disclaimer, the term of this patent is extended or adjusted under 35 U.S.C. 154(b) by 0 days.

(21) Appl. No.: 17/747,080

(22) Filed: May 18, 2022

Related U.S. Application Data

(60) Provisional application No. 63/190,028, filed on May 18, 2021.

(51) Int. Cl.
  *G06T 13/40* (2011.01)
  *G06T 13/20* (2011.01)
  (Continued)

(52) U.S. Cl.
  CPC ............ *G06T 13/40* (2013.01); *G06T 13/205* (2013.01); *G06V 40/176* (2022.01);
  (Continued)

(58) Field of Classification Search
  CPC ..... G06T 13/40; G06T 13/205; G06V 40/176; G06V 40/193; G10L 15/1815; G10L 15/22; G10L 25/63
  See application file for complete search history.

(56) References Cited

U.S. PATENT DOCUMENTS 9,704,103 B2 7/2017 Suskind et al.
10,079,029 B2 9/2018 Amini et al.
(Continued)

OTHER PUBLICATIONS

Porges et al., Chapter 4 from Clinical Applications of the Polyvagal Theory: The Emergence of Polyvagal-Informed Therapies, New York: WW Norton, https://integratedlistening.com/wp-content/uploads/2020/10/polyvagal-primer-from-clinicalapplicationofpolyvagaltheory-3.2019-2/13/18-9:47am.
(Continued)

*Primary Examiner* — Kevin Ky
(74) *Attorney, Agent, or Firm* — Greenberg Traurig, LLP; David J. Dykeman; Kristopher D. Reichlen

(57) ABSTRACT

Systems and methods enabling rendering an avatar attuned to a user. The systems and methods include receiving audio-visual data of user communications of a user. Using the audio-visual data, the systems and methods may determine vocal characteristics of the user, facial action units representative of facial features of the user, and speech of the user based on a speech recognition model and/or natural language understanding model. Based on the vocal characteristics, an acoustic emotion metric can be determined. Based on the speech recognition data, a speech emotion metric may be determined. Based on the facial action units, a facial emotion metric may be determined. An emotional complex signature may be determined to represent an emotional state of the user for rendering the avatar attuned to the emotional state based on a combination of the acoustic emotion metric, the speech emotion metric and the facial emotion metric.

20 Claims, 11 Drawing Sheets

(51) Int. Cl.
  *G10L 15/18* (2013.01)
  *G06V 40/18* (2022.01)
  *G10L 15/22* (2006.01)
  *G06V 40/16* (2022.01)
  *G10L 25/63* (2013.01)
(52) U.S. Cl.
  CPC ........ *G06V 40/193* (2022.01); *G10L 15/1815* (2013.01); *G10L 15/22* (2013.01); *G10L 25/63* (2013.01)

(56) References Cited

U.S. PATENT DOCUMENTS

| | | | |
|---|---|---|---|
| 10,242,501 B1* | 3/2019 | Pusch | G06F 3/016 |
| 10,424,318 B2 | 9/2019 | Levy-Rosenthal | |
| 11,113,859 B1* | 9/2021 | Xiao | G06T 15/005 |
| 2003/0137515 A1* | 7/2003 | Cederwall | G06T 13/40 |
| | | | 345/473 |
| 2008/0096533 A1 | 4/2008 | Manfredi et al. | |
| 2016/0171387 A1 | 6/2016 | Suskind | |
| 2017/0180336 A1* | 6/2017 | Josephson | G06F 21/32 |
| 2018/0018507 A1* | 1/2018 | Chetlur | G06V 40/176 |
| 2018/0047196 A1* | 2/2018 | Du | G06N 5/02 |
| 2018/0204107 A1 | 7/2018 | Tucker | |
| 2018/0331839 A1 | 11/2018 | Gao et al. | |
| 2019/0042894 A1* | 2/2019 | Anderson | G06N 3/0454 |
| 2019/0095775 A1* | 3/2019 | Lembersky | G06N 20/00 |
| 2019/0193280 A1 | 6/2019 | Mendelsohn et al. | |
| 2019/0206402 A1 | 7/2019 | Shukla et al. | |
| 2020/0065569 A1* | 2/2020 | Nduka | G06V 40/20 |
| 2020/0105130 A1* | 4/2020 | Chen | G08G 1/0133 |
| 2020/0167631 A1* | 5/2020 | Rezgui | B25J 9/0084 |
| 2021/0151154 A1 | 5/2021 | Mendelsohn et al. | |
| 2021/0352380 A1* | 11/2021 | Duncan | H04N 21/4852 |

OTHER PUBLICATIONS

Scherer, K. "What are emotions? And how can they be measured?", Social Science Information, vol. 44 No. 4, pp. 695-729, Dec. 1, 2005.

International Search Report and Written Opinion in International Application No. PCT/US2022/029789 dated Jul. 26, 2022.

Yao et al., "Toward Automated Evaluation of Empathetic Responses in Virtual Human Interaction Systems for Mental Health Scenarios" IVA '20: Proceedings of the 20th ACM International Conference on Intelligent Virtual Agents, Oct. 2020, Article No. 57, pp. 1-8—https://doi.org/10.1145/3383652.3423916.

* cited by examiner

SYSTEMS AND METHODS FOR AUTOMATED REAL-TIME GENERATION OF AN INTERACTIVE ATTUNED DISCRETE AVATAR

CLAIM TO PRIORITY

This application claims priority to and the benefit of U.S. Provisional Application 63/190,028, filed on May 18, 2021, which is incorporated herein by reference in its entirety.

FIELD OF TECHNOLOGY

The present disclosure generally relates to computer-based platforms and systems configured for automated real-time generation of an interactive attuned discrete avatar, including responsive artificially generated speech and facial features in response to user interaction.

BACKGROUND OF TECHNOLOGY

Loneliness tends to be a pervasive issue in society. It is what makes social media so popular. But social media "friends" are failed facsimiles of relationships. People want bonding, they need connection. This isolation is felt by everyone but especially people with mental health issues, elderly people without nearby loved ones to interact with, and anyone who feels disconnected from close trusted companions. As an example, there are millions of people retiring from the workforce every year and because of a growing desire to age-in-place, they are being removed from regular in-person interactions. On the other side of the age curve, Japan has experienced the human and economic costs of a "Lost Generation", a young, agoraphobic populace that lives an almost exclusively on-line existence isolated in their rooms. This trend is growing at an alarming rate in the United States as well with 48.3% of Gen Z claiming they lack any meaningful social interaction on a daily basis.

The simple act of talking with someone helps mental acuity and can help stave off depression. A trusted intimate relationship with a caregiver, friend or relative can vastly improve the quality of life for people in long-term care facilities, the physically infirmed or those who live in isolation.

SUMMARY OF DESCRIBED SUBJECT MATTER

In some embodiments, to fill the need for the trusted intimate relationship, an interactive attuned discrete avatar may be created with photorealistic empathic AI driven autonomous virtual companions. Through biometric, physical and vocal markers the interactive attuned discrete avatar may be able to discern emotional cues from body language, vocal qualities (including but not limited to acoustic tone, pitch cadence, etc.), and natural language processing (NLP). In some embodiments, the interactive attuned discrete avatar may be able to portray similar responses in their appearance, facial musculature and be programmed to ask questions to lead a conversation based on inferences about the emotions they observed in the user's behavior. Through this process of connection, synchronizing and attunement between the user and the interactive attuned discrete avatar an attachment may form. From this initial attachment the user may move into transference, the psychological act of observing one's own unconscious moods and images as if they were coming from someone else in close affiliation. This creates a sense of closeness which serves as the beginning of an intimate relationship.

When a person interacts in a safe, confidential environment with a virtual entity (versus with a real human), the person may exhibit less inhibition towards revealing intimate personal details. Users report less perceived risk of being judged by the virtual agent and more comfort in disclosing private, and potentially stigmatizing details about their life. This tendency may be enhanced as attunement between user and the interactive attuned discrete avatar grows and deeper trust is established.

In some embodiments, the interactive attuned discrete avatar may archive information tagged to specific emotional markers and recall this information later when a new event with similar emotionality presents itself. This natural social engagement with the user becomes a "shared history".

In some aspects, the techniques described herein relate to a method including: receiving, by a processor, audio-visual input stream of user communications of a user via an audio-visual input device; wherein the audio-visual input stream includes audio-visual input data across a period of time; determining, by the processor, vocal characteristics of acoustic data of the audio-visual input data based at least in part on at least one of wavelengths, frequencies or amplitudes of the acoustic data; determining, by the processor, at least one time-varying acoustic emotion metric throughout the period of time based at least in part on the vocal characteristics; utilizing, by the processor, at least one speech recognition model to recognize speech data of the audio-visual input stream; utilizing, by the processor, at least one natural language understanding model to produce speech recognition data indicative of meaning, intent and sentiment; determining, by the processor, at least one time-varying speech emotion metric throughout the period of time based at least in part on the speech recognition data; utilizing, by the processor, at least one facial emotion recognition model to produce facial action units representative of recognizes facial features represented in the audio-visual input stream; determining, by the processor, at least one facial emotional state based at least in part on the facial action units and a facial action coding system; determining, by the processor, at least one time-varying facial emotion metric throughout the period of time based at least in part on the at least one facial emotional state; determining, by the processor, at least one time-varying aggregate emotion metric throughout the period of time based at least in part on the at least one time-varying acoustic emotion metric, the at least one time-varying speech emotion metric and the at least one time-varying facial emotion metric; determining, by the processor, an emotional complex signature for the period of time based at least in part on the at least one time-varying aggregate emotion metric; and rendering, via a display, by the processor, an interactive attuned discrete avatar in response to the emotional Complex signature for the period of time.

In some aspects, the techniques described herein relate to a method, further including: determining, by the processor, attuned facial action units attuned to the emotional Complex signature; generating, by the processor, a photorealistic computer-generated face based at least in part on the attuned facial action units; and rendering, via the display, by the processor, the interactive attuned discrete avatar using the photorealistic computer-generated face.

In some aspects, the techniques described herein relate to a method, further including: determining, by the processor, attuned computer-generated speech based at least in part on the emotional Complex signature; determining, by the processor, attuned vocal qualities based at least in part on the vocal characteristics of the acoustic data; determining, by the processor, a synchronization of the photorealistic computer-generated face and the attuned computer-generated speech based at least in part on the attuned vocal characteristics; and rendering, via the display, by the processor, the interactive attuned discrete avatar using the photorealistic computer-generated face, the attuned computer-generated speech and the synchronization of the photorealistic computer-generated face and the attuned computer-generated speech in response to the audio-visual input stream.

In some aspects, the techniques described herein relate to a method, wherein the vocal characteristics include at least one of pitch, loudness, shimmer, jitter, speech rate, harmonics or prosody characteristics.

In some aspects, the techniques described herein relate to a method, wherein the facial action coding system includes Paul Ekman's Facial Action Coding System.

In some aspects, the techniques described herein relate to a method, wherein the at least one facial recognition model includes: a gaze recognition and recording model to recognize and record eye gaze of the user; a turn taking model to recognize a communication turn indicative of a turn to communicate; and a pupil dilation model to determine pupil dilation of the user.

In some aspects, the techniques described herein relate to a method, further including: accessing, by the processor, a memory module that stores previous emotional Complex signatures associated with user reactions; determining, by the processor, the attuned facial action units attuned to the emotional Complex signature and the previous emotional Complex signatures; determining, by the processor, the attuned computer-generated speech based at least in part on the emotional Complex signature and the previous emotional Complex signatures; and determining, by the processor, the attuned vocal characteristics based at least in part on the vocal characteristics of the acoustic data and the previous emotional Complex signatures.

In some aspects, the techniques described herein relate to a method, further including: tagging, by the processor, a high amplitude-high confidence interaction where the emotional Complex signature exceeds a predetermined threshold; storing, by the processor, the high amplitude-high confidence interaction in a long-term memory module; and determining, by the processor, at least one the attuned facial action units, the attuned computer-generated speech, or the attuned vocal characteristics based at least in part on the high amplitude-high confidence interaction.

In some aspects, the techniques described herein relate to a system including: at least one processor; and at least one non-transitory computer readable medium storing software instructions, wherein the at least one processor, upon execution of the software instructions, is configured to: receive audio-visual input stream of user communications of a user via an audio-visual input device; wherein the audio-visual input stream includes audio-visual input data across a period of time; determine vocal characteristics of acoustic data of the audio-visual input data based at least in part on at least one of wavelengths, frequencies or amplitudes of the acoustic data; determine at least one time-varying acoustic emotion metric throughout the period of time based at least in part on the vocal characteristics; utilize at least one speech recognition model to recognize speech data of the audio-visual input stream; utilize at least one natural language understanding model to produce speech recognition data indicative of meaning, intent and sentiment; determine at least one time-varying speech emotion metric throughout the period of time based at least in part on the speech recognition data; utilize at least one facial emotion recognition model to produce facial action units representative of recognizes facial features represented in the audio-visual input stream; determine at least one facial emotional state based at least in part on the facial action units and a facial action coding system; determine at least one time-varying facial emotion metric throughout the period of time based at least in part on the at least one facial emotional state; determine at least one time-varying aggregate emotion metric throughout the period of time based at least in part on the at least one time-varying acoustic emotion metric, the at least one time-varying speech emotion metric and the at least one time-varying facial emotion metric; determine an emotional complex signature for the period of time based at least in part on the at least one time-varying aggregate emotion metric; and render, via a display, an interactive attuned discrete avatar in response to the emotional Complex signature for the period of time.

In some aspects, the techniques described herein relate to a system, wherein the at least one processor, upon execution of the software instructions, is further configured to: determine attuned facial action units attuned to the emotional Complex signature; generate a photorealistic computer-generated face based at least in part on the attuned facial action units; and render, via the display, the interactive attuned discrete avatar using the photorealistic computer-generated face.

In some aspects, the techniques described herein relate to a system, wherein the at least one processor, upon execution of the software instructions, is further configured to: determine attuned computer-generated speech based at least in part on the emotional Complex signature; determine attuned vocal qualities based at least in part on the vocal characteristics of the acoustic data; determine a synchronization of the photorealistic computer-generated face and the attuned computer-generated speech based at least in part on the attuned vocal characteristics; and render, via the display, the interactive attuned discrete avatar using the photorealistic computer-generated face, the attuned computer-generated speech and the synchronization of the photorealistic computer-generated face and the attuned computer-generated speech in response to the audio-visual input stream.

In some aspects, the techniques described herein relate to a system, wherein the vocal characteristics include at least one of pitch, loudness, shimmer, jitter, speech rate, harmonics or prosody characteristics.

In some aspects, the techniques described herein relate to a system, wherein the facial action coding system includes Paul Ekman's Facial Action Coding System.

In some aspects, the techniques described herein relate to a system, wherein the at least one facial recognition model includes: a gaze recognition and recording model to recognize and record eye gaze of the user; a turn taking model to recognize a communication turn indicative of a turn to communicate; and a pupil dilation model to determine pupil dilation of the user.

In some aspects, the techniques described herein relate to a system, wherein the at least one processor, upon execution of the software instructions, is further configured to: access a memory module that stores previous emotional Complex signatures associated with user reactions; determine the attuned facial action units attuned to the emotional Complex signature and the previous emotional Complex signatures; determine the attuned computer-generated speech based at least in part on the emotional Complex signature and the previous emotional Complex signatures; and determine the attuned vocal characteristics based at least in part on the vocal characteristics of the acoustic data and the previous emotional Complex signatures.

In some aspects, the techniques described herein relate to a system, wherein the at least one processor, upon execution of the software instructions, is further configured to: tag a high amplitude-high confidence interaction where the emotional Complex signature exceeds a predetermined threshold; store the high amplitude-high confidence interaction in a long-term memory module; and determine at least one the attuned facial action units, the attuned computer-generated speech, or the attuned vocal characteristics based at least in part on the high amplitude-high confidence interaction.

In some aspects, the techniques described herein relate to a non-transitory computer readable medium having software instructions stored thereon, the software instructions configured to cause at least one processor to perform steps including: receiving audio-visual input stream of user communications of a user via an audio-visual input device; wherein the audio-visual input stream includes audio-visual input data across a period of time; determining vocal characteristics of acoustic data of the audio-visual input data based at least in part on at least one of wavelengths, frequencies or amplitudes of the acoustic data; determining at least one time-varying acoustic emotion metric throughout the period of time based at least in part on the vocal characteristics; utilizing at least one speech recognition model to recognize speech data of the audio-visual input stream; utilizing at least one natural language understanding model to produce speech recognition data indicative of meaning, intent and sentiment; determining at least one time-varying speech emotion metric throughout the period of time based at least in part on the speech recognition data; utilizing at least one facial emotion recognition model to produce facial action units representative of recognizes facial features represented in the audio-visual input stream; determining at least one facial emotional state based at least in part on the facial action units and a facial action coding system; determining at least one time-varying facial emotion metric throughout the period of time based at least in part on the at least one facial emotional state; determining at least one time-varying aggregate emotion metric throughout the period of time based at least in part on the at least one time-varying acoustic emotion metric, the at least one time-varying speech emotion metric and the at least one time-varying facial emotion metric; determining an emotional complex signature for the period of time based at least in part on the at least one time-varying aggregate emotion metric; and rendering, via a display an interactive attuned discrete avatar in response to the emotional Complex signature for the period of time.

In some aspects, the techniques described herein relate to a non-transitory computer readable medium, wherein the software instructions are further configured to cause the at least one processor to perform steps including: determining attuned facial action units attuned to the emotional Complex signature; generating a photorealistic computer-generated face based at least in part on the attuned facial action units; and rendering, via the display the interactive attuned discrete avatar using the photorealistic computer-generated face.

In some aspects, the techniques described herein relate to a non-transitory computer readable medium, wherein the software instructions are further configured to cause the at least one processor to perform steps including: determining attuned computer-generated speech based at least in part on the emotional Complex signature; determining attuned vocal qualities based at least in part on the vocal characteristics of the acoustic data; determining a synchronization of the photorealistic computer-generated face and the attuned computer-generated speech based at least in part on the attuned vocal characteristics; and rendering, via the display the interactive attuned discrete avatar using the photorealistic computer-generated face, the attuned computer-generated speech and the synchronization of the photorealistic computer-generated face and the attuned computer-generated speech in response to the audio-visual input stream.

In some aspects, the techniques described herein relate to a non-transitory computer readable medium, wherein the software instructions are further configured to cause the at least one processor to perform steps including: accessing a memory module that stores previous emotional Complex signatures associated with user reactions; determining the attuned facial action units attuned to the emotional Complex signature and the previous emotional Complex signatures; determining the attuned computer-generated speech based at least in part on the emotional Complex signature and the previous emotional Complex signatures; and determining the attuned vocal characteristics based at least in part on the vocal characteristics of the acoustic data and the previous emotional Complex signatures.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
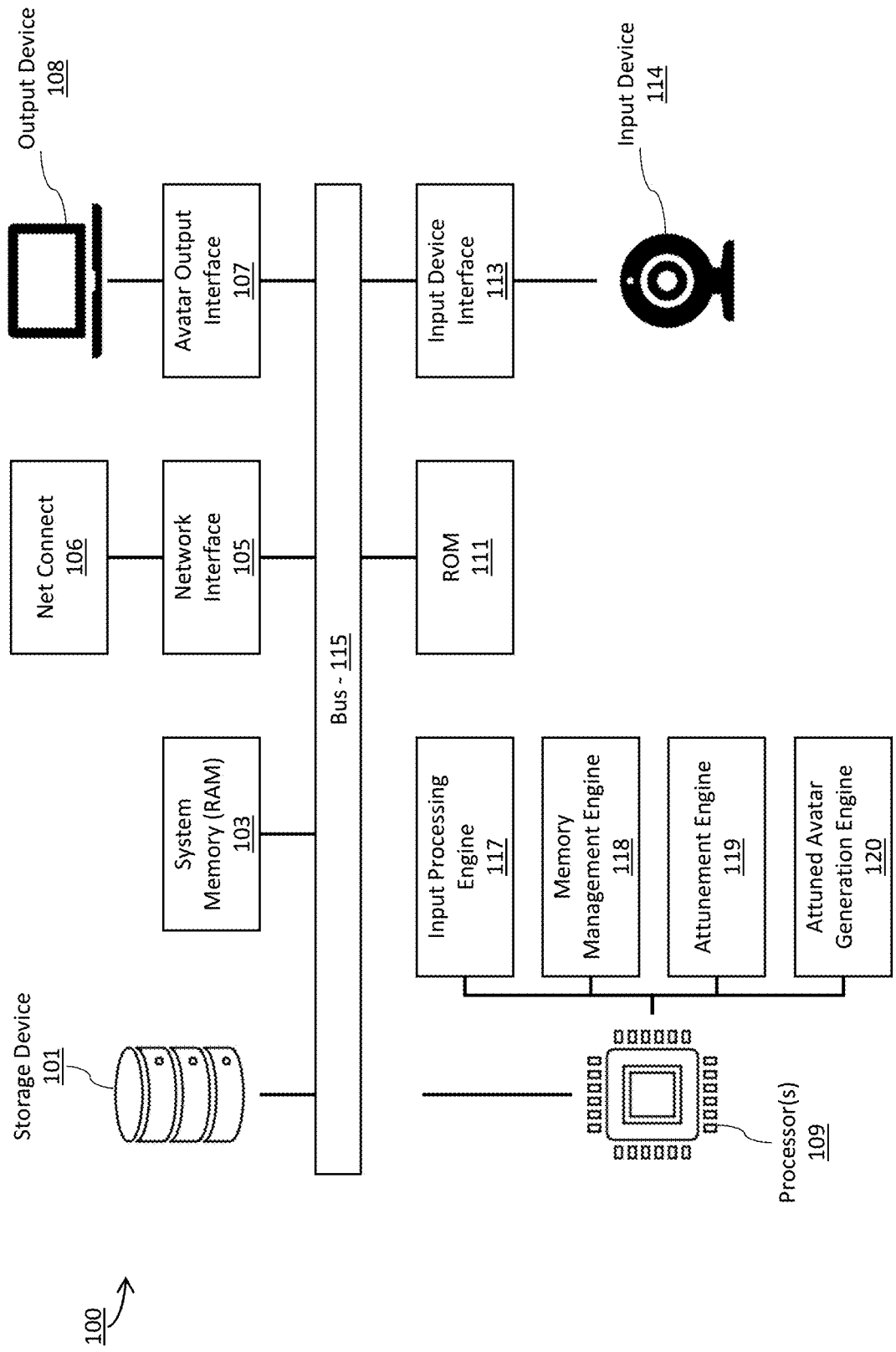
FIG. 1 is a block diagram of an exemplary computer-based system and platform for producing an interactive attuned discrete avatar responsive to user input in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 11 illustrate systems and methods of virtual companion and interactive avatar generation and rendering using synchronized facial and vocal characteristics based on real-time processing of user interactions. The following embodiments provide technical solutions and technical improvements that overcome technical problems, drawbacks and/or deficiencies in the technical fields involving machine learning, natural language processing and generation, emotion recognition and reproduction, speech pattern recognition and generation, among other virtual avatar-related technical fields, which typically have drawbacks of an inability to render emotion-based animation, inaccurate synchronization of facial and vocal characteristics including emotional state, inefficient management of computer memory for short-term and long-term storage, among other deficiencies. As explained in more detail, below, technical solutions and technical improvements herein include aspects of improved memory management using a combination of short-term and long-term computer memory, improved real-time user speech and expression recognition using emotional state recognition, and improved dynamic and adaptive virtual avatar generation and rendering including leveraging the memory management and real-time recognition to determine a virtual avatar emotional state, synchronizing facial and vocal characteristics of the avatar and rendering the avatar for interaction with the user. Based on such technical features, further technical benefits become available to users and operators of these systems and methods. Moreover, various practical applications of the disclosed technology are also described, which provide further practical benefits to users and operators that are also new and useful improvements in the art.

In some embodiments, rendering an avatar with emotion characteristic synchronization can employ and/or be responsive to both verbal and non-verbal (e.g., speech and non-speech, respectively) forms of communicating meaning. In some embodiments, verbal forms of communication may be 30 percent of a given interaction and non-verbal forms may be 70 percent of the given interaction. Other proportions may be employed, including, e.g., 75 percent speech, 70 percent speech, 60 percent speech, 50 percent speech, 40 percent speech, 30 percent speech, 25 percent speech, 20 percent speech, 10 percent speech, etc., or any proportion in a range from 10 percent to 90 percent speech and 90 percent to 10 percent non-speech.

In some embodiments, non-speech characteristics of an interaction may reflect activity of the autonomic nervous systems (ANS) of the user and may be used for a simulated ANS of the avatar, e.g., according to a polyvagal theory. For example, vocal and facial expressions (e.g., tone, pitch, cadence, facial expressions, body language, vocal prosody harmonizing, or other characteristics of vocal and/or facial expressions or any combination thereof), may be associated with ANS activity. The vocal and facial expressions may thus be weighted in a given interaction according to the contribution to meaning in the given interaction, e.g., 70 percent or other suitable proportion as described above. The content of the speech of the given interaction may then be weighted according to the proportion attributable to speech, e.g., 30 percent or other proportion as described above. This corresponds to verbal communication being related to cortical activity of the brain, and the ANS stimulation to the limbic system, cerebellum, brain stem and nervous system functions, a much larger section of the brain and nervous system.

In the readouts from the visual input and the sound input we privilege the highest absolute value arousal amplitudes in discrete sections as predominant signals of the ANS. This allows us to discount fluctuations of low absolute value arousal as noise. These arousals are related to the salience network in the brain. The salience network in the brain determines what matters to the individual.

From a relational perspective, bonding happens by way of constant rupture and repair of the relationship. It strengthens the relational bond in the same way that muscles are strengthened by weight training which actually ruptures the muscular tissue. After this, the muscular tissue grows back stronger. The avatar may include software functionality to detect rupture as indicated by predefined user statements of feeling misunderstood. One or more machine learning models of the avatar may then be trained in a "repair sequence" including generating and rendering a response, e.g. "When did I lose you?" and training the one or more machine learning models based on the user response.

In some embodiments, to enhance the emotional bonding between the avatar and the user, emotional state of the user may be measured according to Complexes, and similarly the avatar may be rendered according to Complexes. A Complex is an unconscious configuration of embodied imagery pervaded by a common feeling tone as expressed by the ANS detectable through bio-markers. Examples of Complexes may include: Inferiority Complex, Mother Complex, Victim Complex, Power Complex, etc. Complexes appear as highly individualized, differing from human to human.

A Complex may be recognized via system in real-time via, e.g., a signature morphology of bio-marker amplitudes over a given period, e.g., 10 seconds, 15 seconds, 20 seconds, 30 seconds, 40 seconds, 45 seconds, 50 seconds 60 seconds, or other suitable period or any combination thereof, including any period within a range of between 5 seconds and 120 seconds. In some embodiments, the bio-marker amplitudes may be captured for emotion classification according to a suitable dimensional model, such as valence-arousal measurement, valence-arousal-dominance measurement, valence-arousal-resistance measurement, six emotion axes, eight emotion axes, among others or any combination therefore, or a suitable discrete categorical model. For example, biomarkers may be measured to determine, e.g., highest absolute value arousal within a discrete section and view the valence at that moment. However, other forms of biometrics may be employed, such as, e.g., galvanic skin response (GSR), skin temperature, heart rate, heart variability, among others or any combination thereof For example, a model for emotional measurement may include, e.g., Scherer' s octagonal model including positive/ negative in place of valence, active/passive in place of arousal, high power/control-low power/control in place of dominance, obstructive/conducive in place of resistance, etc. (see, for example, FIG. 5). A grid and/or map may be overlaid over the V/A wheel to indicate the exact location of the V/A to map the V/A vectors to regions indicative of particular emotional states.

Herein, the term valence may refer to a measure of the pleasantness and/or unpleasantness indicated by non-speech expression, e.g., as measured using the Facial Action Coding System and micro-expressions, muscle activity detected through facial electromyography, functional brain imaging, or by any other suitable valence measurement technique or any combination thereof Herein, the term arousal may refer to an intensity indicated by the non-speech expression such as amplitudes on a graph measuring ANS activity, e.g., by way of the Ekman coding system or through measurement of electrodermal responses. High amplitudes might refer to sympathetic nervous system activities, low amplitudes might refer to parasympathetic nervous system activity.

Herein, the term dominance may refer to the level of power and control the individual experiences over and within their emotional and physical state.

Herein, the term resistance may refer to the level of emotional resistance the user exhibits in a given circumstance or state, measured on a scale from obstructive to conducive.

In some embodiments, a particular emotional label may be applied to the given interaction based on the biomarker measurements, e.g., using the Associated Dimensional Affect emotion wheel or other suitable classification model or any combination thereof. Peaks in arousal may create differentiated, and often conflicting, emotional states over a longer section of time (e.g. 20 seconds or more). The progression and variation of emotional states over time may form a signature morphology of emotions that can be called an Embodied State. The system for the avatar may be configured to continuously search memory of previously stored interactions with similar signatures to the given interaction performed by the user. When an embodied state appears more frequently than a defined threshold, the software may be configured to label the state as expression of a Complex. When a Complex is detected, the system may refer back to previous moments when the Complex was active and generate a response asking the user for connections. The re-emergence of the same Complex may unconsciously generate a similar embodied ANS response. As a result, the system may record Complexes, embodied states and user responses to learn the paradoxical emotional landscape of the user creating a library of Complex responses. The more memories that are generated, the greater the sophistication and extent of the Complex library for improved recognition of the user's embodied state at any given interaction. For example, the system may be increasingly aware of emotional regularities in the user and can compare the verbal communication during those Complex moments. The system may remind the user of the similarity between those moments. As a result, the avatar may be generated based on the user's emotional Complexes to simulate strong empathy with the user, thus eliciting in the User a sense of being understood.

In some embodiments, the system may utilize the above principles to create interactive attuned discrete avatars maybe photorealistic human replicas, e.g., seen from mid-torso to the top of their head, and capable of torso, face and head movements. The face maybe constructed on a platform similar to human anatomy with a musculature on top of a fixed frame, under a cutaneous and subcutaneous layer allowing for the display of both "normal" and more specifically, micro expressions which the user may sense and observe on a subliminal level. A shadow image of the user may be silhouetted in the interactive attuned discrete avatar pupil creating a sensation of intimate presence.

In some embodiments, the avatar may be animated based on a layering of virtual analogs to human anatomy, including, e.g., physiological layers of skeleton, musculature, dermis, pores, imperfections, wrinkles, capillary response, etc. Such layers facilitate animate that simulates the behavior of each layer, thus enabling photorealistic avatars and believability beyond the "uncanny valley". In some embodiments, the avatar may further include a secondary layer structure of psychological emotions, each of differing intensity, lasting for differing amounts of time and occurring concurrently. Each layer may be embodied as constriction of specific facial muscles creating specific expressions or ghost outlines of expressions. The outermost emotional layer may be the emotional mirroring of the user, which may be a diluted version of the facial expressions of the user after a delay (e.g., 1, 2, 3, 4, 5, 6, or more second delay). Below emotional mirroring layer, a layer may be rendered for facial expression associated with any identified Complex State which the User is presently exhibiting. The facial expression layer may be more subtle than the mirroring layer but may last longer, such as, e.g., 5, 10, 15, 20 seconds or more or any length in the range of 20 to 30 seconds or other suitable length of time. A third psychological layer may be the user's mood. In some embodiments, the mood may be representative of a quadrant of the VA wheel, or other suitable emotion/mood mapping tool or any combination thereof, where the user's emotions are appearing the most frequently. The mood layer may be again more subtle than either of the mirroring layer or the facial expression layer and again last longer, e.g., on the order of minutes, such as in the range of approximately 2 to 4 minutes or other suitable range. The gestalt of these concurrent layers may create a perception of the complexity with which humans experience emotions and deepen the bonding between user and avatar.

In some embodiments, an interactive attuned discrete avatar may include at least four main inputs Vision, Vocal Acoustic, NLP and Net Connect live fed into the Attunement engine 119 and the interactive attuned discrete avatar's responses in at least three capabilities; facial generation, natural and inflective human sounding voice, and cogent dialog emotionally connected to the user's present state.

In some embodiments, to aid in the interactive attuned discrete avatar humanistic interpretive skills some of the advanced ideas in Psychology and the Creative Arts may be incorporated to expand both understanding of user interaction with interactive attuned discrete avatar and the interactive attuned discrete avatar interaction with users. To accomplish this, a psychoanalytical technique known as Embodied Imagination® may be employed to see interactions from perspectives beyond one's own.

In some embodiments, an exercise called Repetition may be incorporated into the interactive attuned discrete avatar training. Through this activity the interactive attuned discrete avatar may receive continuous real-time feedback on its attunement. In some embodiments, Repetition may include a back-and-forth between the avatar and the user such that the avatar may be programming to ask and/or assert emotional characteristics of the user based on imagery and audio captured by input devices. The user may provide feedback to the emotional characteristics stated by the avatar to provide training data to update the models of the avatar and improve recognition of emotions and attunement to the emotions. In some embodiments, the user may also provide feedback to the rendered expressions of the avatar as a technique for training the models of the avatar for improved attunement to the user.

In some embodiments, the Embodied Imagination® and/or Repetition processes may be performed periodically and/or as an initial calibration process during a first interaction. In some embodiments, the user may select to perform the calibration process on-demand. In some embodiments, the calibration process may be automatically initiated upon each predetermined interval of time and/or number of interactions or by any other period or any combination thereof.

Avatar/human training, reinforcement learning may be implemented using avatar/avatar interactions. The avatar/avatar interactions enable the interactive attuned discrete avatar to process millions of iterations of avatar/avatar communications and feed the emergent phenomena that result back into the machine learning algorithm of the interactive attuned discrete avatar for further attunement and adjustment of the guard rails to avoid feedback loops. Therefore, the interactive attuned discrete avatar may become several orders of magnitude more advanced in its human understanding than without the reinforcement learning step.

In some embodiments, the interactive attuned discrete avatar may be application based, running on internal code and accessing external application programming interfaces (API) as necessary. In some embodiments, the interactive attuned discrete avatar may rely on edge computation as much as possible for data security purposes, to keep the cloud compute costs down and decrease latency from the system. In some embodiments, the interactive attuned discrete avatar may have several thousand response cues pre-programmed and an ability to dynamically alter its iteration based on input cueing. In some embodiments, through stored and tagged conversational memory of previous engagement cycles, a running history of an evolving relationship with a particular user may facilitate improved attunement to the particular user.

FIG. 1 is a block diagram of an exemplary computer-based system and platform for producing an interactive attuned discrete avatar responsive to user input in accordance with one or more embodiments of the present disclosure.

In some embodiments, the user may interact with an attuned avatar system 100, including an interactive attuned discrete avatar (hereinafter referred to as the "avatar") produced thereon, on any input device 114 upon which they currently engage in video and/or audio enabled communication (e.g., desktop computer, laptop computer, tablet or smartphone, Virtual Reality or Augmented Reality Headsets or Glasses, among others or any combination thereof). In some embodiments, the user may use the input device 114 to interface with the attuned avatar system 100 via an input device interface 113. In some embodiments, the input device interface 113 may include any suitable wired or wireless communication interface suitable for receiving input data from the input device 114. In some embodiments, examples of the input device interface 113 may include, e.g., universal serial bus (USB), peripheral card interface express (PCIe), serial ATA (SATA), Thunderbolt, Firewire, HDMI, DisplayPort, Bluetooth, WiFi, Zigbee, Z-Wave, among others or any combination thereof.

In some embodiments, the input device interface 113 may receive user input from the input device 114. In some embodiments, user input may include a live audio and/or video feed of the user interaction with the attuned avatar system 100 using vocalizations, gestures, facial expressions, body language, among other forms of communication. In some embodiments, the input device 114 may capture the live audio and/or video feed using a suitable digital imaging device (e.g., digital camera, webcam, etc.), a suitable microphone, or both.

In some embodiments, the attuned avatar system 100 may include, e.g., a storage device 101. In some embodiments, the data storage solution of the storage device 101 may include, e.g., a suitable memory or storage solutions for maintaining electronic data representing the activity histories for each account. For example, the data storage solution may include database technology such as, e.g., a centralized or distributed database, cloud storage platform, decentralized system, server or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof In some embodiments, the storage device 101 may receive the live audio and/or video feed from the input device interface 113, e.g., via a bus 115 or other communication interface. In some embodiments, the storage device 101 may store the live audio and/or video feed for long-term or short-term storage, e.g., permanently or on a rolling window basis. For example, the storage device 101 may store each frame or other segment of the live audio and/or video for a limited period of time before deletion, such as, e.g., 1 day, 5 days, 7 days, 14 days, 21 days, 30 days, 31 days, three months, six months, one year, etc.

In some embodiments, additionally or alternatively, the live audio and/or video feed may be temporally stored in in a system memory or random-access memory (RAM) 103. In some embodiments, the RAM 103 may include static RAM (SRAM) and/or dynamic RAM (DRAM). The RAM 103 may receive the live audio and/or video feed from the input device interface 113 or the storage device 101 via the bus 115. By providing the live audio and/or video feed to the RAM 103, a processor or processors 109 may efficiently access the live audio and/or video feed for processing.

In some embodiments, the processor(s) 109 may implement multiple computer engines for utilizing various functions and modules to generate the avatar based on the user communications captured in the live audio and/or video feed. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU) or graphics processing unit (GPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to process the live audio and/or video feed and recognize the communications, such as, e.g., the words spoken, facial expressions, body language, tone, among other communications or any combination therefore, the processor(s) 109 may include a computer engine including an input processing engine 117. In some embodiments, the input processing engine 117 may include dedicated and/or shared software components, hardware components, or a combination thereof. For example, the input processing engine 117 may include a dedicated processor of the processor(s) 109. However, in some embodiments, the input processing engine 117 may share hardware resources, including the processor(s) 109 with other computer engines.

In some embodiments, data from the input processing engine 117 may be used to attune the avatar using an attunement engine 119. In some embodiments, attuning the avatar ("attunement") may normalize the data from the input processing engine 117 on a graph or other scoring system to score emotional state of the user as captured in the live audio and/or video feed, such as, e.g., a Valance-Arousal-Dominance graph, by creating a unifying scale over the inputs and weighting them based on confidence. In some embodiments, the emotional state may be informed by data collected from one or more additional biometric inputs. For example, additional sensors may input biometric data, such as, e.g., heartrate via objects worn by the user such as a smart watch or the skin connection points of VR or AR goggles and glasses. Additionally, a Galvanic Skin Response may be read via a wearable device on the hands or feet, such as a glove, a finger cap or a sock which will measure autonomic nervous system (ANS) responses. These inputs may be fed to the attunement engine 119 which may further refine the determination of the holistic emotions of its user and improve accuracy in identifying Complexes.

In some embodiments, when a point of heightened arousal, as quantified by one of the input devices, is observed the corresponding valance may be noted and an emotion label of each input source determined by the attunement engine 119. These valance/arousal emotion labels may vary between input sources. If a specific collection of valance/arousal amplitudes, known in the art as a Signature Morphology, and/or corresponding emotional labels, known in the art as Emotional Signature, over all input sources repeats over a span of, e.g., 15 to 30 seconds, 15 to 45 seconds, 15 to 60 seconds, 10 to 30 seconds, 10 to 45 seconds, 10 to 60 seconds, 5 to 30 seconds, 5 to 45 seconds, 5 to 60 seconds, or any other suitable period, the attunement engine may label the signature patterns as a Complex, label this Complex Signature, and send the Complex Signature and associated situational context being described by the User to memory.

The attunement engine 119 may determine its impression of the user's emotion, or Complex, which may be sent to a memory for reference processing, then returned to the attunement engine 119. Based on all input data, both sensate and sentiment, the corresponding emotive state of the avatar may be determined and delivered to an attuned avatar generation engine 120 for attuned visual response by the avatar and the natural language generation engine for attuned empathic response by the conversational AI speech engine.

In some embodiments, the attunement engine 119 may utilize the processed input data to determine the emotive state by using a combination of working memory (e.g., short-term memory) and long-term memory. Accordingly, a memory management engine 118 may be employed to coordinate the long-term memory and short-term memory to distinguish between data from the memory management engine 118 that may be employed for long-term influence and for short-term influence on attunement of the avatar. Accordingly, in some embodiments, the memory management engine 118 may include dedicated and/or shared software components, hardware components, or a combination thereof. For example, the memory management engine 118 may include a dedicated processor of the processor(s) 109. However, in some embodiments, the memory management engine 118 may share hardware resources, including the processor(s) 109 with other computer engines.

In some embodiments, the long-term memory and short-term memory may use memory devices or other storage devices integrated into the memory management engine 118. In some embodiments, the memory management engine 118 may utilize the RAM 103 for short-term memory and the storage device 101 for long-term memory, the RAM 103 for both long-term and short-term memory, the storage device 101 for both long-term and short-term memory, or any suitable distribution of long-term memory and short-term memory across the storage device 101, RAM 103 and storage devices of the memory management engine 118.

In some embodiments, the attuned avatar generation engine 120 may receive the emotive state from the attunement engine 119 to determine an attuned emotive state of the avatar. In some embodiments, an attuned emotive state may include, e.g., tone, pitch, cadence, facial expressions, body language, vocal prosody harmonizing, or other communications or any combination thereof that are similar to the emotive state indicated by the communications of the user. In some embodiments, a similar emotive state may include, e.g., a score of an emotional state (e.g., using the VAD graph) that varies from the user's score by a predetermined value or percentage, such as, e.g., a score within ten percent, fifteen percent, twenty percent, or other suitable range.

In some embodiments, based on the attuned emotive state, the attuned avatar generation engine 120 may generate avatar speech using a machine learning based speech generation model. In some embodiments, tone, prosody and synthesis of the speech may be modulated by a machine learning based text to speech (TTS) model. Similarly, the attuned avatar generation engine 120 may generate avatar facial expressions using a machine learning based facial generation model. The speech and facial expressions may be synchronized using a suitable synchronization algorithm.

In some embodiments, the attunement engine 119 may include dedicated and/or shared software components, hardware components, or a combination thereof. For example, the attunement engine 119 may include a dedicated processor of the processor(s) 109. However, in some embodiments, the attunement engine 119 may share hardware resources, including the processor(s) 109 with other computer engines.

In some embodiments, the processor(s) 109 may implement the input processing engine 117, the memory management engine 118, the attunement engine 119 and attuned avatar generation engine 120 using software instructions stored in a read only memory (ROM) 111. In some embodiments, the ROM 111 may provide the instructions to the processor(s) 109 for execution via the bus 115. In some embodiments, the ROM 111 may include any suitable non-volatile memory used in computers and other electronic devices. In some embodiments, the non-volatile memory may be configured such that data stored in ROM 111 cannot be electronically modified after the manufacture of the memory device.

In some embodiments, the attuned avatar, including the speech, facial expressions and other communications produced by the attuned avatar generation engine 120 may be output for display to the user in response to the user's communications. In some embodiments, to do so, the processor(s) 109 may instruction an output device interface 107 to communicate the avatar from the attuned avatar system 100 to an output device 108.

In some embodiments, the output device interface 107 may include any suitable data interface for communicating the avatar to an output device. In some embodiments, examples of the output device interface 107 may include, e.g., universal serial bus (USB), peripheral card interface express (PCIe), serial ATA (SATA), Thunderbolt, Firewire, HDMI, DisplayPort, Bluetooth, WiFi, Zigbee, Z-Wave, among others or any combination thereof.

In some embodiments, the output device 108 may include a suitable device for display the facial expressions of the avatar and/or any suitable device for playing the audio of the speech of the avatar. Accordingly, in some embodiments, the output device 108 may include, e.g., a laptop computer, desktop computer, television, monitor, speaker, smartphone, tablet, Virtual Reality headset, Augmented Reality glasses or any other suitable audio and/or visual output device or any combination thereof Additional outputs may also be provided instead of or in addition to the attuned avatar, such as, e.g., haptic output to a user worn smartwatch, glove, AR/VR headset or other wearable device having haptic/vibration hardware. For example, the haptic output may be in the form of a glove worn on the user's hand, such as the user's non-dominant hand (e.g., for improved perception), though haptic output may be provided to any suitable body part via any suitable haptic device. The glove may constrict or apply pressure to various points on the hand to mimic being held, squeezed, or touched. Such an output may further the sense of bonding and intimacy. Additionally, haptic touch pads may be integrated into user's clothing or entire bodysuits which could be stimulated by the system.

Figure 2:
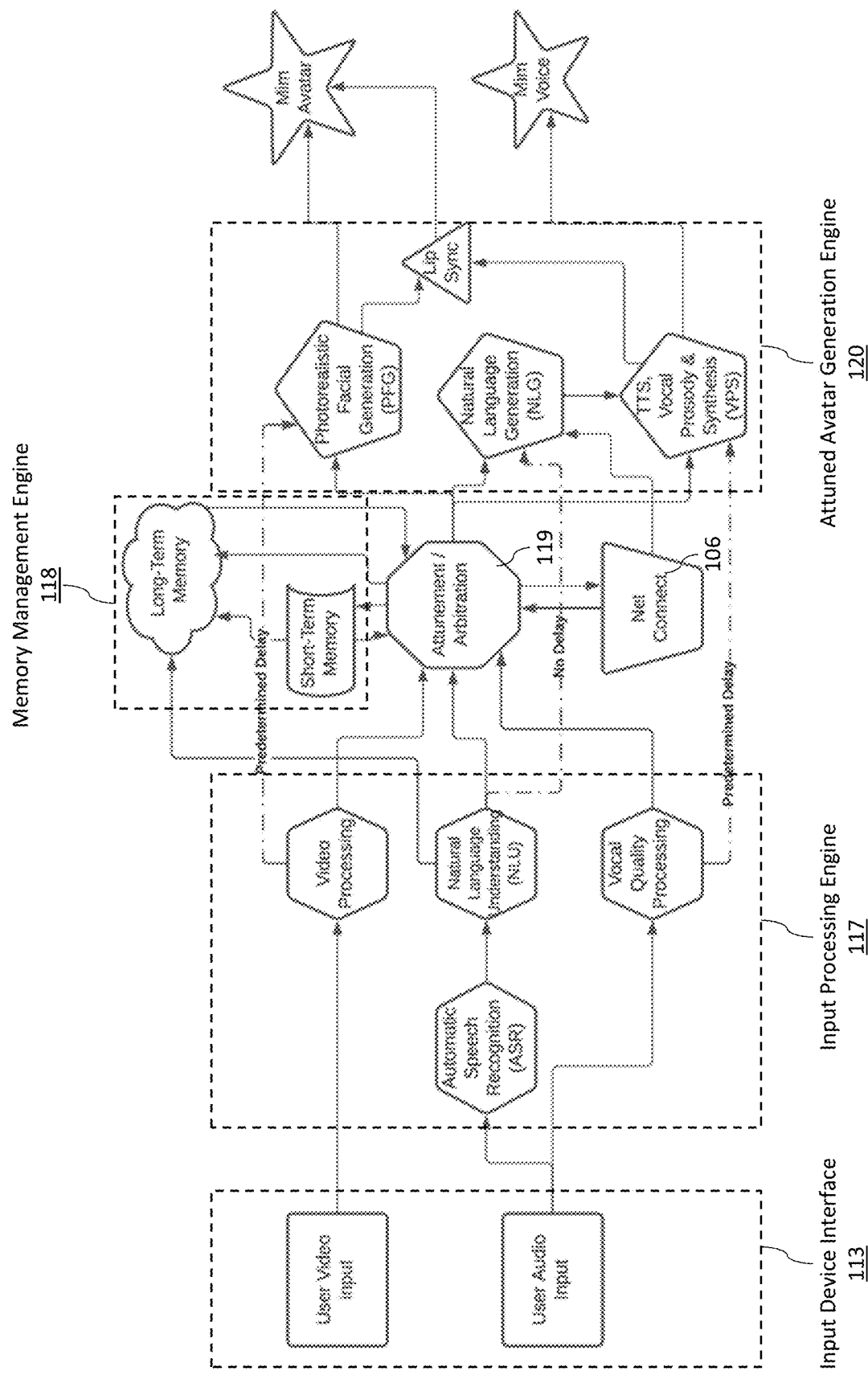
FIG. 2 is a block diagram of another exemplary computer-based system and platform for the attuned avatar system 100 in accordance with one or more embodiments of the present disclosure.

FIG. 2 is a block diagram of another exemplary computer-based system and platform for the attuned avatar system 100 in accordance with one or more embodiments of the present disclosure.

Figure 6:
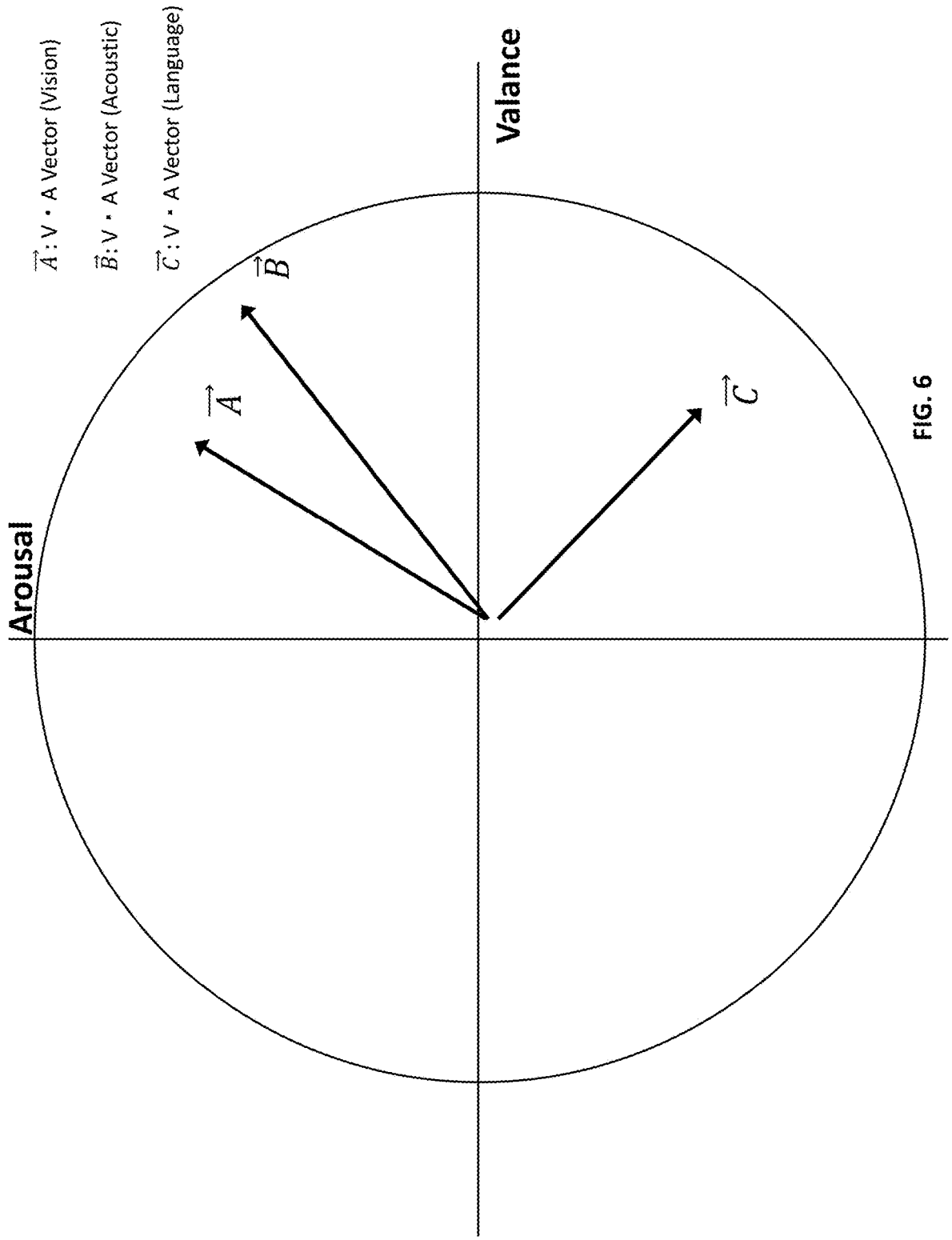
FIG. 6 is an example of VAD vectors for vision, acoustic and language vectors mapped to valance and arousal dimensions of a VAD graph in accordance with one or more embodiments of the present disclosure.

As seen in FIG. 2, the video and audio inputs may be broken into three component parts for emotion and sentiment analysis: Vision, Acoustic and Language. These related but separate analyses may take place simultaneously and their outputs may be sent to the attunement engine 119. In some embodiments, the attunement engine 119 may receive the discrete input data in the form of either Valance-Arousal-Dominance 3D graph vectors, Valance-Arousal 2D graph vectors, or as individual Valance, Arousal and Dominance data points from each of the Video Processing Module (Vision Input), the Vocal Quality Component (Acoustic Input) and the NLU Component (language Input). An example of the 3 vector forms in a single Valance/Arousal 2-D graph is shown in FIG. 6 where $\vec{A}$, $\vec{B}$, $\vec{C}$ are the vector form inputs for Vision, Acoustic and language respectively.

In some embodiments, the attunement engine 119 may run the vector function calculation of:

$$f(\psi) = \frac{x\vec{A} + y\vec{B} + z\vec{C}}{x + y + z} \qquad \text{(Equation 1)}$$

where x, y & z are normalizing weight factors $f(\psi)$ is the weighted and normalized decision statement function $\psi$ is the user emotion decision statement In some embodiments, this emotion decision statement, $\psi$, may be fed into the working memory management engine 118 for comparative assessment to determine if an emotional state change has occurred. If the amplitude of $\psi$ spikes above a predetermined limit, the statement may be additionally sent to long-term memory for associative comparisons from previous interactions for contextual purposes.

In some embodiments, the short-term (working) memory may indicate if the user is still in the same emotional state.

If amplitude of emotion is above a certain threshold it sends the emotion to long-term memory for comparison and affect associations. This may be used in question generation.

The attunement engine 119 may have programing to packetize discreet segments, e.g., every second, every half second, every two seconds, etc. The attunement engine 119 may record the discrete VA coordinates of the visual and audio input modalities throughout the preceding span (e.g., 15 to 30 seconds, 15 to 45 seconds, 15 to 60 seconds, 10 to 30 seconds, 10 to 45 seconds, 10 to 60 seconds, 5 to 30 seconds, 5 to 45 seconds, 5 to 60 seconds, or any other suitable period as described above), as well as the granular sentiment understanding on a 5 to 9 unit scale from very negative to very positive. The sentiment reading may be temporal over a predefined time allotment. These segments may be stored in short-term operating memory. Additionally, the attunement engine 119 may store a timestamped text readout of the entire conversation. The packet may be represented as concurrent waveforms, e.g., three concurrent waveforms representative of the valence, arousal, and sentiment, respectively. Each new packet may be compared against all previous packets stored in short-term memory after a preset delay (e.g., packets from within the present delay of the conversation may not be considered). In some embodiments, the preset delay may be any suitable delay for . . . , such as, e.g., 10 seconds, 15 seconds, 20 seconds, 25 seconds, 30 seconds, 35 seconds, 40 seconds, 45 seconds, 50 seconds 55 seconds, 60 seconds, or more, or any other suitable delay within a range of, e.g., 5 seconds and 120 seconds.

In some embodiments, upon pattern recognition software detecting a pattern match within a predetermined acceptance threshold the attunement engine 119 may trigger the attunement engine 119 to inject a question into the conversation, referring to the stored text of the matching packet. If the user agrees that there is a similarity in feeling the attunement engine 119 may label that collection of all three waveform as a Complex Candidate and store it in long-term memory. The similarity may be assessed between any one, two or all three of the waveforms with corresponding waveforms of the Complex Candidate to determine similarity and whether the Complex Candidate is a match. In some embodiments, more waveform matches may correlate to higher certainty of identifying a Complex Signature. From the time stamped text associated to the Complex Candidate timeframe an idiosyncratic metaphor label of that Complex Candidate will be generated by way of poetic association of words within that given time segment. This will be the way in which each Complex Candidate and Complex Signature will be referenced to the user. At the beginning of each session with the user the working memory management engine 118 may shift copies all Complex Candidates to short-term memory in order to facilitate the Complex Candidates to be reviewed along with the current interaction. When a Complex Candidate is positively identified repeatedly over a predetermined number of instances, the Complex Candidate will be labeled as a Complex Signature and working memory management engine 118 may permanently store the Complex Signature in short-term memory and referred to during subsequent interactions. In some embodiments, the predetermined number of instances may include, e.g., 2, 3, 4, 5, 6, 7, 8, 9, 10 or more.

In some embodiments, the pattern recognition software may include, e.g., one or more suitable statistical, supervised machine learning, semi-supervised machine learning, or unsupervised machine learning models for classification. Examples of statistical classification models may include parametric models, such as linear discriminant analysis, quadratic discriminant analysis, maximum entropy classifier, logistic regression, multinomial logistic regression, etc., or nonparametric models, such as decisions trees, kernel estimation, K-nearest neighbor, Naïve Bayes, neural network (e.g., convolutional neural network (CNN), recurrent neural network (RNN) or others), perceptrons (e.g., multilayer perceptrons (MLP)), support vector machines, gene expression programming, etc. Examples of clustering methods may include categorical mixture model, hierarchical clustering, k-means clustering, correlation clustering, kernel principal component analysis, etc., Examples of ensemble learning for pattern recognition may include, e.g., boosting, bootstrap aggregating ("bootstrap"), ensemble averaging, mixture of experts, hierarchical mixture of experts, etc. Examples of real-valued sequence labeling for pattern recognition may include, e.g., gaussian process regression, linear regression, independent component analysis, principal component analysis, etc. Examples of sequence labeling methods for pattern recognition may include, e.g., conditional random fields (CRF), hidden Markov model (HMM), maximum entropy Markov model (MEMM), RNN, dynamic time warping (DTW), etc.

Based on $\psi$, any return from the memory management engine 118 and the content analysis from the NLU, the attunement engine 119 may output an emotional response, $\Pi$, for the avatar with an accompanying amplitude $\Delta$.

In some embodiments, the memory management engine 118 may be housed in two separate areas. Immediate discrete moment-to-moment memory may be housed on the device in working memory while long-term memory may be hosted either locally on the device or remotely in the cloud. In the case of cloud storage, all data may be encrypted using state-of-the-art third party software and all identifying data or other personal data may be removed before being transmitted to the cloud. The input $\psi$ from the attunement engine 119 may be stored in working memory, e.g., for approximately 3-7 minutes, to identify changes/consistency in emotional state and given associated NLU tags and markers. These tags may be compared against working data and forwarded to long-term memory for storage. If similarities exist, they may be returned to Attunement engine 119 for sentiment comparison before being passed along to the NLG.

In some embodiments, working memory keeps the consistency of the conversation. In some embodiments, long-term memory is accessed when there is a change in the emotion of the moment or an amplitude spike. In some embodiments, the normalized graph is sent to long-term memory with a contextual tag that can be accessed later when a similar graph is created with context or the language used that accompanied the strong change or amplitude spike.

In some embodiments, if the amplitude of $\psi$ exceeds specific threshold, determined through testing, it may be transferred to long-term memory storage. There again it may be compared to existing $\psi$ files for comparative similarity. If stored data meets a similarity threshold then that data may be transferred back to the attunement engine 119 and NLG.

In some embodiments, the amplitude of three component parts, Vision, Acoustic and Language can also be cross-compared to determine an emotive consistency of any particular interaction. In some embodiments, the vectors $\vec{A}$, $\vec{B}$, $\vec{C}$ each have an amplitude and a direction in the VAD graph or $\vec{A}$ & $\vec{B}$ in a VA graph. The greater the similarity between $\vec{A}$, $\vec{B}$ and $\vec{C}$ in both amplitude and direction, the greater the degree of emotive consistency. That said, discrepancies in $\vec{A}, \vec{B}, \vec{C}$ are expected and are colinear to human experience of emotion interpretation. Additionally, the vision and audio and, in some embodiments, the NLP, may have associative confidences for specific output data which grow when emotions are more direct and less subtle. The confidences may be used in line with the literal intensity of speech to determine high amplitude or by way of sustained arousal reading over any of the three input sources over a prescribed period of time. Finally, any dramatic shifts in emotion where the user goes from, for example, happy to very sad or neutral to angry may be identified, e.g., as high amplitude. In some embodiments, where the emotive consistency across the Vision, Acoustic and Language inputs exceeds a predetermined threshold for amplitude/confidence, the interaction, the Vision input, the Acoustic input, the Language input or any combination thereof, may be added to the long-term memory with the associated context data, e.g., what the User is talking about at that moment, for later access and reference in determining context and emotive state associations between past emotive Complexes and states and current emotive situation.

In some embodiments, the avatar's visual characteristics may be modified, the language response generated, and the prosody, tone, cadence, speech rate, loudness, glimmer, shimmer and pitch of the vocal response calibrated. From there the voice may be synthesized, sent to the video imagining for lip-syncing and then to the device speakers. The video may be incrementally adjusted from the previous discrete moment to avoid sudden facial shifts or jerky video quality and then output to the device display.

In some embodiments, the output avatar may include a virtual presence having the form of a photorealistic avatar. In some embodiments, the avatar's form may be processed in the photorealistic facial generation module and the voice may be processed in the vocal prosody & synthesis module.

In some embodiments, the photorealistic generation model may generate the avatar with a shoulders-up rendering of a realistic person. In some embodiments, the photorealistic facial generation module may include a suitable three-dimensional rendering engine and/or any other suitable computer-generated imagery technology. In some embodiments, the avatar may continuously adapt to input stimuli, changing its expressions and mannerisms. The photorealistic facial generation may receive emotional commands from the attunement engine 119 in the form of an emotional response $\Delta\Pi$. The module may then manipulate the neutral facial features of the avatar according to the Facial Action Units (FAU) associated with $\Pi$ and with an amplitude according to received input $\Delta$. Additionally, the user's original recorded FAUs may be transmitted directly from the video processing module, incorporating a predetermined delay, and may be slowly superimpose over the FAUs based on the $\Pi$. The delay may ensure that the user does not feel mirrored, mimicked or parodied.

In some embodiments, as described above, manipulating the facial features of the avatar may employ a multi-layered approach. In some embodiments, the avatar may be animated based on a layering of virtual analogs to human anatomy, including, e.g., physiological layers of skeleton, musculature, dermis, pores, imperfections, wrinkles, capillary response, etc. Such layers facilitate animate that simulates the behavior of each layer, thus enabling photorealistic avatars and believability beyond the "uncanny valley". In some embodiments, the avatar may further include a secondary layer structure of psychological emotions, each of differing intensity, lasting for differing amounts of time and occurring concurrently. Each emotional layer may be embodied as constriction of specific facial muscles creating specific expressions or ghost outlines of expressions, e.g., using the physiological layers. The outermost emotional layer may be the emotional mirroring of the user, which may be a diluted version of the facial expressions of the user after a delay (e.g., 1, 2, 3, 4, 5, 6, or more second delay). Below emotional mirroring layer, a layer may be rendered for facial expression associated with any identified Complex State which the User is presently exhibiting. The facial expression layer may be more subtle than the mirroring layer but may last longer, such as, e.g., 5, 10, 15, 20 seconds or more or any length in the range of 20 to 30 seconds or other suitable length of time. A third psychological layer may be the user's mood. In some embodiments, the mood may be representative of a quadrant of the VA wheel, or other suitable emotion/mood mapping tool or any combination thereof, where the user's emotions are appearing the most frequently. The mood layer may be again more subtle than either of the mirroring layer or the facial expression layer and again last longer, e.g., on the order of minutes, such as in the range of approximately 2 to 4 minutes or other suitable range. The gestalt of these concurrent layers may create a perception of the complexity with which humans experience emotions and deepen the bonding between user and avatar.

In some embodiments, the natural language generation unit may employ state-of-the-art response generation with billions of parameter associations, e.g., such as a suitable natural language generation machine learning model. It may be programmed to respond to the user both organically and with specific phrasing. As the unit learns more about the user's speech style, patterns and complexities it may evolve to adopt the user's verbiage and colloquialisms. It may receive content inputs from the NLU and long-term memory components which may trigger response construction. The NLG may also receive $\Delta\Pi$ instruction from the attunement engine 119 and incorporated sensory input observations, emotional cueing and conversation start/stop indicators. In some embodiments, the output of the NLG may be a text transcript of the avatar's response.

In some embodiments, the vocal prosody & synthesis (VPS)/TTS module may create the avatar's voice. It may receive inputs from the NLG with what to say, $\Delta\Pi$ from the attunement engine 119 which may inform how to say it and, after a predetermined delay, inputs from the vocal quality input component with raw vocal characteristic data which may be employed for prosody harmonizing with the user. In some embodiments, the delay of 1500 ms to 4000 ms based on autonomic nervous system research may ensure that the user does not feel mirrored, mimicked or parodied. In some embodiments, from these data the VPS may generate the avatar's voice with its vocal characteristics and inflections that may convey the non-linguistic vocal content of the conversation. In some embodiments, the actual voice may be constructed from component pieces of human actor recording sessions and assembled from deep neural network TTS systems producing a natural sounding voice with human-like emphasis and inflections.

In some embodiments, before the avatar's voice is sent to the device's speakers it may process back into the PFG for lip syncing. Then video may be displayed on the output device 108 with motion synced audio.

Figure 3:
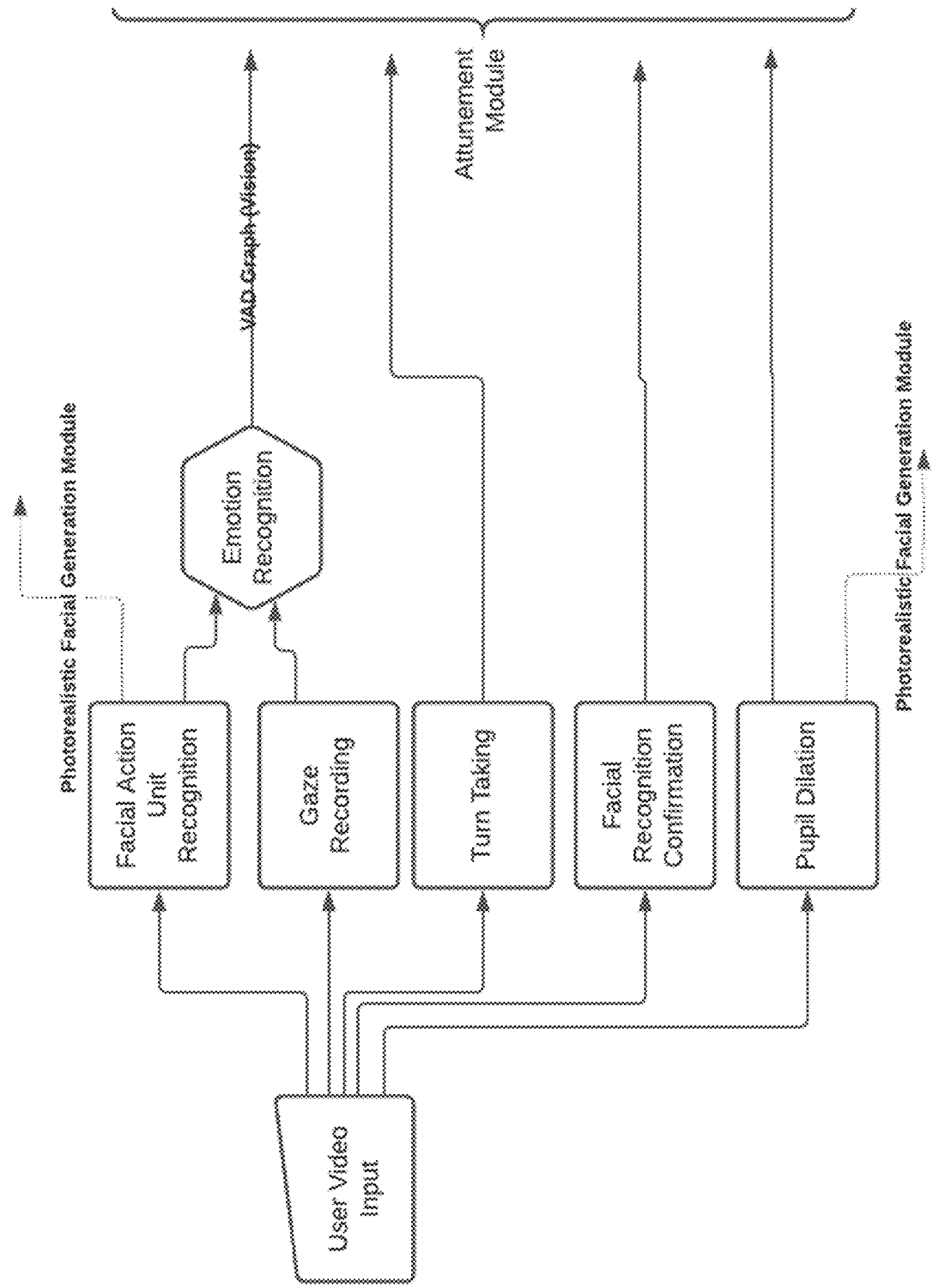
FIG. 3 is a block diagram of another exemplary computer-based system for visual input and video processing by the input processing engine 117 of the attuned avatar system 100 in accordance with one or more embodiments of the present disclosure.

FIG. 3 is a block diagram of another exemplary computer-based system for visual input and video processing by the input processing engine 117 of the attuned avatar system 100 in accordance with one or more embodiments of the present disclosure.

Figure 5:
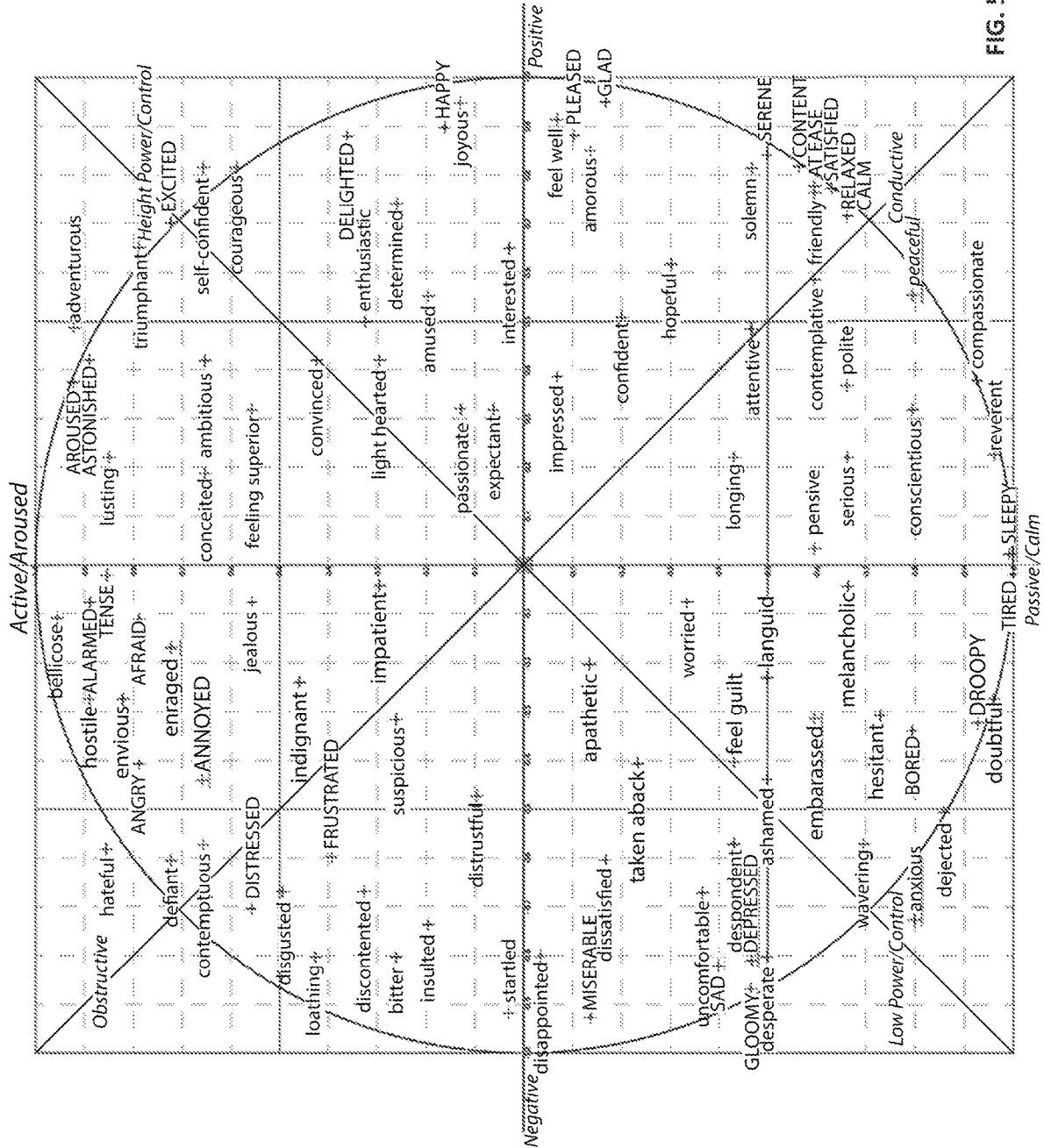
FIG. 5 is an example of a VAD graph in accordance with one or more embodiments of the present disclosure.

In some embodiments, the video input may be processed through the video processing module of the input processing engine 117. Inside the video processing module, the video image may be analyzed in continuous, near real-time, discrete time segments. At each time segment the facial expression of the user may be broken down by Facial Action Units (FAU) from which emotions may be perceived based on Paul Ekman's Facial Action Coding System (FACS). Gaze position may be tracked to determine comfort/avoidance and engagement/disengagement. Pupil dilation may be measured to assess pleasure/distaste indicators. The processing of all these data may result in emotion identification mapped out on a Valance/Arousal/Dominance 3-dimensional graph. (A 2-D sample of a Valance/Arousal graph showing emotional states is seen in FIG. 5). The Valance/Arousal graph of FIG. 5 may be designed according to, e.g., Scherer, Klaus R.; (2005); "What are emotions" And how can they be measured?"; Social Science Information; Vol 44(4), pp. 695-729, which is incorporated herein by reference in its entirety. This $VAD_{vision}$, and/or the individual datum, may be output to the attunement engine 119. In addition to this output, the user's FAUs, along with their intensity, and pupil dilation measurements may be fed directly to the Facial Generation output to influence the appearances of the avatar's Avatar. Research indicates that the physical response time of the autonomic nervous system to be approximately 1500 ms. Therefore, after a delay, randomly varying between 1800 ms to 4000 ms these measurements and facial activity may be partially mirrored by the face of the avatar in concert to the emotional cuing output from the Attunement engine 119. This delay may alleviate the impression of imitation.

In some embodiments, the video processing module may have facial recognition capabilities so the avatar may "recognize" the user. If it is not the authorized user of the avatar, it may enact privacy protocols. In some embodiments, the video processing module may additionally use eye-gaze tracking to enhance Turn-taking analysis which may inform output decisions between turn-yielding and turn-holding.

In some embodiments, examples of the attuned avatar system 100 may include implementations to mimic, e.g., a friend on a call, a bridge to the world, a therapeutic assistance, personal assistant functionality, digital employees (e.g., web-based, call centers, in-person, etc.), a translator, a space travel companion, a training patient for medical practitioners, a teacher's assistant, a personal trainer, a creativity assistance person, among others or any combination thereof.

Figure 4:
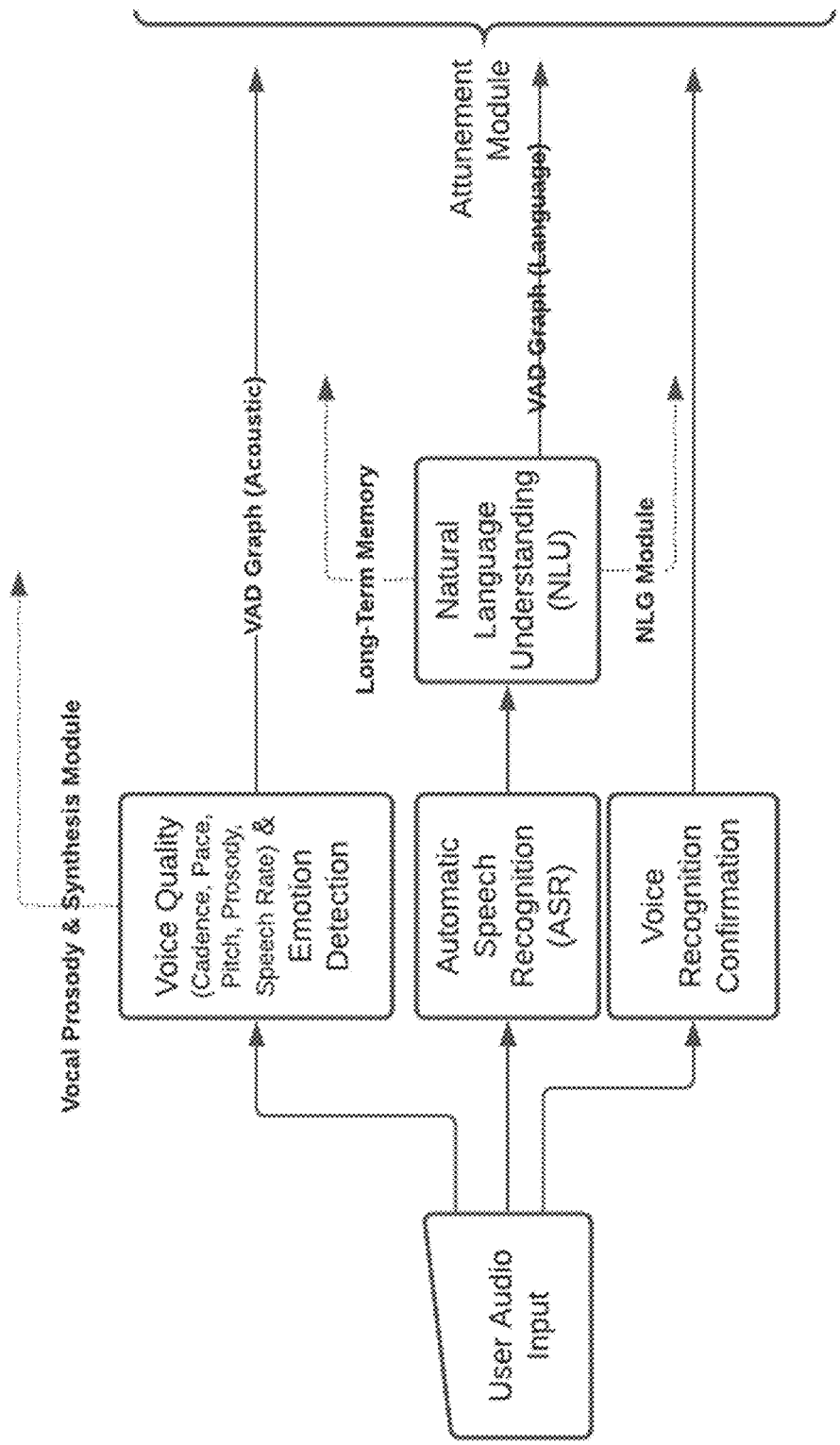
FIG. 4 is a block diagram of another exemplary computer-based system for audio input and audio processing by the input processing engine 117 of the attuned avatar system 100 in accordance with one or more embodiments of the present disclosure.

FIG. 4 is a block diagram of another exemplary computer-based system for audio input and audio processing by the input processing engine 117 of the attuned avatar system 100 in accordance with one or more embodiments of the present disclosure.

In some embodiments, the audio input may be processed through an audio processing module of the input processing engine 117. In some embodiments, the audio processing may separate Vocal Quality and Automatic Speech Recognition (ASR) or Speech-To-Text (STT).

In some embodiments, the Vocal Quality Component may measure various vocal characteristics including but not limited to: Pitch, Loudness, Shimmer, Jitter, Speech Rate, Harmonics and Prosody Characteristics, e.g., according to harmonization of wavelengths and/or frequencies and/or amplitudes, e.g., according to music theory. From this data emotional state computations may be performed, and Valance/Arousal/Dominance, $VAD_{Acoustic}$ outputs, and/or the individual datum, may be sent to the Attunement engine 119. Additionally, in some embodiments, the vocal characteristics may be sent directly to the Vocal Prosody & Synthesis Module for output prosody harmonizing, e.g., according to harmonization of wavelengths and/or frequencies and/or amplitudes, e.g., according to music theory. In some embodiments, the harmonizing may be continuously adjusting during the interlocution but may attempt to remain one musical third above or below the user's speech. As with the Video Processing Module, there may be an incorporated delay in prosodic harmonizing to avoid the user feeling parroted.

In some embodiments, the audio processing module may have vocal recognition capabilities so the avatar may "recognize" the user. If it is not the authorized user of the avatar, it may enact privacy protocols. In some embodiments, the audio processing module may employ advanced turn-taking analysis combining standard silence threshold metric (normally set between 500-2000 ms) with prosodic cuing of intonation patterns of the preceding speech interpause unit (IPU). When level intonation patterns remain in the middle of the user's fundamental frequency range the system may err towards turn-keeping identifiers. Additionally, raw indicators from the ASR towards midsentence connection words (and, of, like, if, but, etc) may additionally override simple silence threshold indicators. All this may be combined to inform output reaction of when to respond.

In some embodiments, the audio processing module may convert the speech into text which may feed into the Natural language Understanding (NLU) Component. In this component the meaning, intent and sentiment of the language may be determined. These outputs, $VAD_{Language}$, and/or the individual datum, may be fed into the Attunement engine 119. The output may also be fed to the long-term memory Component of the Memory management engine 118 for associative referencing and to the Natural language Generation (NLG) Component for response composition.

FIG. 5 is an example of a VAD graph in accordance with one or more embodiments of the present disclosure. In some embodiments, various emotive states may be mapped to a location in the VAD graph according to the length and direction of VAD vectors across axis extending from positive to negative, and active/aroused to passive/calm.

FIG. 6 is an example of VAD vectors for vision, acoustic and language vectors mapped to valance and arousal dimensions of a VAD graph in accordance with one or more embodiments of the present disclosure. In some embodiments, to determine an aggregate VAD vector indicative of a user's total emotive state may include, e.g., vector addition.

Figure 7:
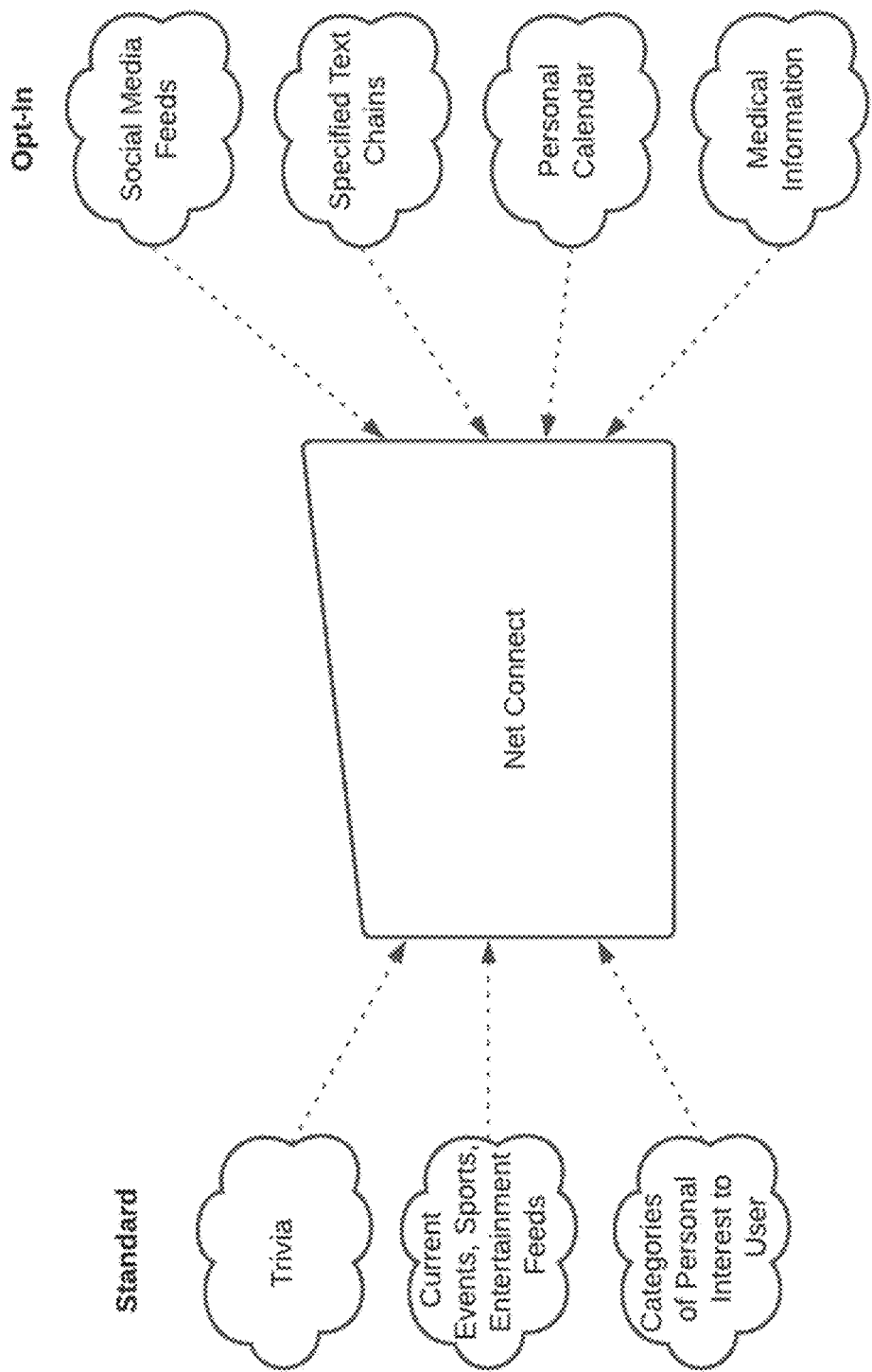
FIG. 7 is a block diagram of another exemplary computer-based system a net connect module 106 of the attuned avatar system 100 in accordance with one or more embodiments of the present disclosure.

FIG. 7 is a block diagram of another exemplary computer-based system a net connect module 106 of the attuned avatar system 100 in accordance with one or more embodiments of the present disclosure.

In some embodiments, the net connect module 106 may be the avatar's link to external sources of information via a network interface 105 of the attuned avatar system 100. In some embodiments, relevant details about the user are determined during onboarding. In some embodiments, onboarding may include, during an initial-use conversation the user has with the avatar, specific questions may be asked to ascertain aspects of the user's personality and interests. Interests may be weighted, assigned value indicators and current information on these topics may be continuously retrieved from published online sources for ready use in conversation along with trivia and current events that are generationally and geographically relevant to the user. In some embodiments, the avatar may ask about people in the user's life, tag names with contextual meaning and store these tags in long-term memory. If the user choses to opt-in to the functionality, the avatar may also have the ability to scan the user's social media feeds and specified text chains for additional conversation material and context. In some embodiments, the avatar may also be able access the user's medical requirements thus allowing the ability to remind the user medications/appointments and calendar/life events important to the user.

In some embodiments, the avatar may constantly be updated with a cache of information that is appropriate and of interest to the user. It may pull generationally and geographically relevant trivia, current events, news/sports/entertainment updates based on the user's interests, movie/TV/book/theatre reviews, interesting bits of current events. The avatar may use this information peppered through its interactions with the user as conversation pieces, anecdotes and topics of conversation to enhance and enliven the communication. The avatar may continue to refine the information it pulls through machine learning based off its interactions with the user. In some embodiments, the net connect module 106 may have additionally abilities on an opt-in bases only. The user may be able to give it curated access to their social media feeds and specific text chains from which the avatar can extract prescient information for discussion. In some embodiments, the avatar may be granted access to the user's personal calendars and tasks and remind the user of upcoming appointments, deadlines or due dates. In some embodiments, the user may have the ability to connect the avatar with their medical history which may allow their avatar to help keep them current with their medications and doctor's visits.

EXAMPLE 1

A friend on Call

In some embodiments, many people feel the isolation of modern life. Although more connected than ever, we are often physically disconnected and separated. This can lead to severe loneliness. For an elderly person who does not live close to family, there may not be too many people available to interact with on a consistent basis. For a young person who has hundreds of social media "friends" but few to no confidants, the world can appear bleak. For a caregiver who feels isolated in their work life and needs someone to decompress with. In some embodiments, an avatar will be the entity that will always be available to them and wanting to talk. The avatar will always be glad to see the user. Always interested and curious about what is going on in their life and inside their head. Always happy to talk about everything and nothing; from the existential to the trivial, the mundane to the mystical. The avatar is always present and wholly committed to its user.

EXAMPLE 2

A Bridge to The World

The numbers of people withdrawing from physical society is surprising. Japan has its own term for these people, Hikikomori and "The Lost Generation". In the US, the amount of people who no longer leave their homes and now interact with society on an entirely digital level is counted in the millions. In some embodiments, an avatar will be a bridge for these people with human interactions. The avatar is not intended to replace human-to-human connection or communication but augment it and supply the user with an avenue for intimacy that may be currently lacking.

EXAMPLE 3

Therapeutic Assistance

As the stigmas around mental health recede many more people are seeking therapy and there is an acute shortage of practitioners. In some embodiments, while not a therapeutic tool in itself, the avatar may be a way for a person to continue their healing work between formal therapy sessions with the discussion concepts and thoughts they are currently working on with their therapist. In some embodiments, the user may then also have the option to record interactions for later therapeutic review.

Example 4

Personal Assistant Functionality

In some embodiments, an avatar may have access to your calendar to add appointments and remind you of existing ones. In some embodiments, the avatar may be instructed to perform tasks normally done through human interaction, such as, e.g., find reservations or wait on hold and let you know when the person comes back on the line. In some embodiments, the avatar can become a personal assistant for all things digital and have access to all the information the internet provides.

EXAMPLE 5

Digital Employees—Web based

As video conferencing through Zoom and FaceTime become more ubiquitous in modern life, we may begin to expect it in our interactions with businesses as well. As human communication is between 70-93% non-verbal, the ability to understand all that is being expressed without saying a word and the related emotionality coming from the potential customer may generate a user experience which may dramatically improve a person's feeling about a product and a company. In some embodiments, an avatar may be employed as a more natural digital employee to a chat bot or prerecorded response.

EXAMPLE 6

Digital Employees—Call Centers

A customer with an issue can video call into the help center where not only their voice but their facial expressions and prosody patterns can be read by an avatar and an instant rapport is established. Rapport is a central part of sales and of information communication. Through pattern recognition technology and a large database of prior cases, avatars can anticipate a customer's wishes so the customer feels heard and seen. When tasks become too complex for the avatar it can find available humans without wait time, since through its natural warmth and curiosity it can entertain customers until such human becomes available.

EXAMPLE 7

Digital Employees—in Person

Whether it's the stack of medical forms that await anyone entering into a doctors office or the happiest government agencies like the DMV, an avatar can interview each client and customer and record the data as required. In some embodiments, there is no risk of an avatar insulting a customer and the avatar may be able to deescalate acrimonious situations. In some embodiments, the avatar may also keep clients occupied as they wait for the human practitioner to be free.

EXAMPLE 8

Translator

In some embodiments, avatars can be emotionally intelligent go-betweens in situations when people communicate simultaneously in various languages. Since avatars are sensing-based, they can pay attention to non-verbal cues that are being communicated and incorporate this information into their translation. Since the avatar "lives" on your phone, it is ideal for travel.

Example 9

Space Travel Companion

Astronauts spend large amounts of time in space with little outside contact. In some embodiments, a specifically prepared avatar trained by experienced astronauts can provide intimate interaction without the feeling of being judged and can be directly connected to the spacecraft's intelligent systems if needed.

EXAMPLE 10

Training Patient For Medical Practitioners

Currently many medical schools employ actors to play the role of patient for medical students to try and make diagnoses. It is an expensive process. In some embodiments, an avatar can be programmed with hundreds of different maladies which can present both physically and through manufactured test data to give med students a much more real experience in patient interaction. The students may also be able to improve their interpersonal patient skills and can be evaluated on their Emotional Intelligences along with their medical knowledge.

EXAMPLE 11

Teacher's Assistant

A student who needs help often can't interact with an instructor at the moment of need. In some embodiments, an avatar can be trained to have encyclopedic knowledge of a subject and an understanding of the pitfalls students most commonly fall into. But beyond just a catalog of FAQs the avatar may have the ability to patiently take the student through the information as many times and as slowly as is necessary for the student to fully comprehend the material.

EXAMPLE 12

Personal Trainer

In some embodiments, an avatar may be tuned to emote a more active emotive state to help push the user through a workout. In some embodiments, the avatar can work with the user's fitness level, physical abilities and limitations to craft a tailored routine for the individual and then give real-time feedback on reps, form and activities. In some embodiments, the avatar may motivate the user to get going when their resolve or desires are flagging and champion them through the process.

EXAMPLE 13

Creativity Assistance

In some embodiments, the avatar has access to the entire history of writing, painting and music. AI has already written plays and poetry, made music and painting. In some embodiments, the avatar may be used to stimulate artists and help them through their blocks. As art may become increasingly human/AI hybrid this may lead to remarkable hitherto unforeseen artistic creations.

Figure 8:
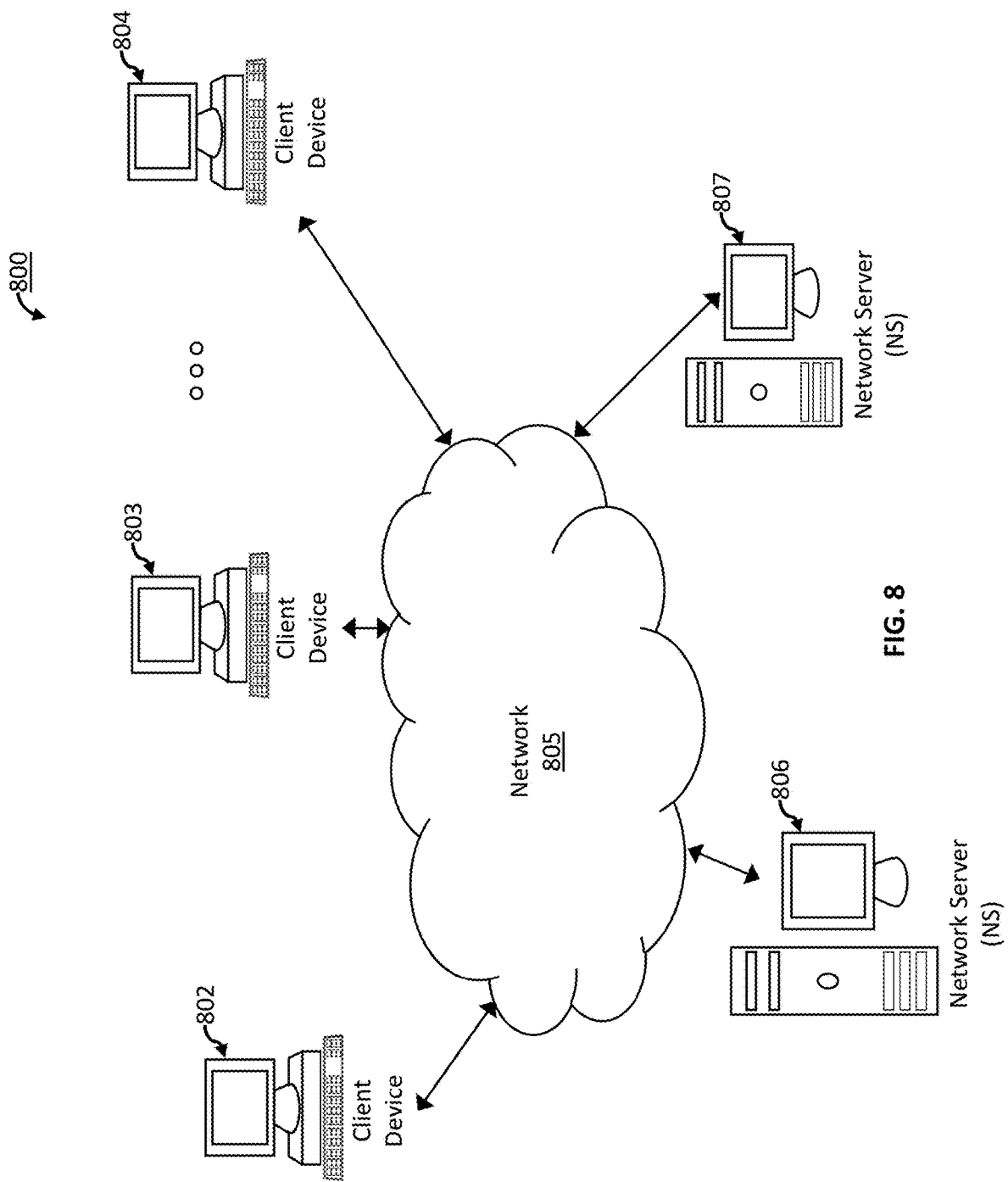
FIG. 8 depicts a block diagram of an exemplary computer-based system and platform 800 in accordance with one or more embodiments of the present disclosure.

FIG. 8 depicts a block diagram of an exemplary computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 800 may be configured to manage a large number of members and concurrent transactions, as detailed herein. In some embodiments, the exemplary computer-based system and platform 800 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 8, member computing device 802, member computing device 803 through member computing device 804 (e.g., clients) of the exemplary computer-based system and platform 800 may include virtually any computing device capable of receiving and sending a message over a network (e.g., cloud network), such as network 805, to and from another computing device, such as servers 806 and 807, each other, and the like. In some embodiments, the member devices 802-804 may be personal computers, multiprocessor systems, microprocessor-based or programmable consumer electronics, network PCs, and the like. In some embodiments, one or more member devices within member devices 802-804 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 802-804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), Virtual Reality goggles, Augmented Reality glasses and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 802-804 may include may run one or more applications, such as Internet browsers, mobile applications, voice calls, video games, videoconferencing, and email, among others. In some embodiments, one or more member devices within member devices 802-804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup language (SMGL), such as HyperText Markup language (HTML), a wireless application protocol (WAP), a Handheld Device Markup language (HDML), such as Wireless Markup language (WML), WMLScript, XML, JavaScript, and the like. In some embodiments, a member device within member devices 802-804 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 802-804 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 805 may provide network access, data transport and/or other services to any computing device coupled to it. In some embodiments, the exemplary network 805 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 805 may implement one or more of a GSM architecture, a General Packet Radio Service (GPRS) architecture, a Universal Mobile Telecommunications System (UMTS) architecture, and an evolution of UMTS referred to as Long-term Evolution (LTE). In some embodiments, the exemplary network 805 may include and implement, as an alternative or in conjunction with one or more of the above, a WiMAX architecture defined by the WiMAX forum. In some embodiments and, optionally, in combination of any embodiment described above or below, the exemplary network 805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 805 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 805 may also include mass storage, such as network attached storage (NAS), a storage area network (SAN), a content delivery network (CDN) or other forms of computer or machine readable media.

In some embodiments, the exemplary server 806 or the exemplary server 807 may be a web server (or a series of servers) running a network operating system, examples of which may include but are not limited to Apache on Linux or Microsoft IIS (Internet Information Services). In some embodiments, the exemplary server 806 or the exemplary server 807 may be used for and/or provide cloud and/or network computing. Although not shown in FIG. 8, in some embodiments, the exemplary server 806 or the exemplary server 807 may have connections to external systems like email, SMS messaging, text messaging, ad content providers, etc. Any of the features of the exemplary server 806 may be also implemented in the exemplary server 807 and vice versa.

In some embodiments, one or more of the exemplary servers 806 and 807 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 801-804.

In some embodiments and, optionally, in combination of any embodiment described above or below, for example, one or more exemplary computing member devices 802-804, the exemplary server 806, and/or the exemplary server 807 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 9:
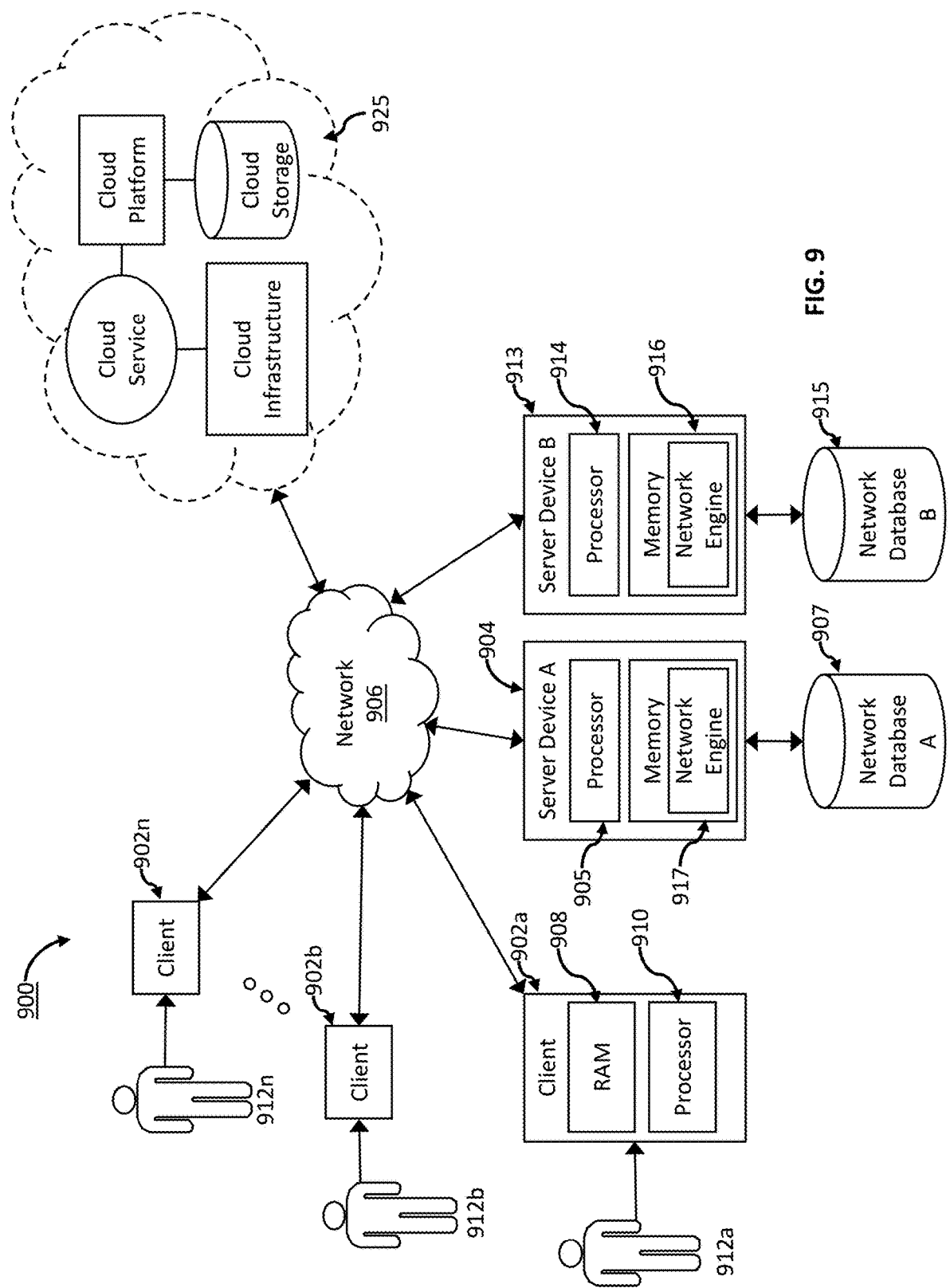
FIG. 9 depicts a block diagram of another exemplary computer-based system and platform 900 in accordance with one or more embodiments of the present disclosure.

FIG. 9 depicts a block diagram of another exemplary computer-based system and platform 900 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 902*a,* member computing device 902*b* through member computing device 902*n* shown each at least includes a computer-readable medium, such as a random-access memory (RAM) 908 coupled to a processor 910 or FLASH memory. In some embodiments, the processor 910 may execute computer-executable program instructions stored in memory 908. In some embodiments, the processor 910 may include a microprocessor, an ASIC, and/or a state machine. In some embodiments, the processor 910 may include, or may be in communication with, media, for example computer-readable media, which stores instructions that, when executed by the processor 910, may cause the processor 910 to perform one or more steps described herein. In some embodiments, examples of computer-readable media may include, but are not limited to, an electronic, optical, magnetic, or other storage or transmission device capable of providing a processor, such as the processor 910 of member computing device 902*a,* with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 902*a* through 902*n* may also comprise a number of external or internal devices such as a mouse, a CD-ROM, DVD, a physical or virtual keyboard, a display, or other input or output devices. In some embodiments, examples of member computing devices 902*a* through 902*n* (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In some embodiments, member computing devices 902*a* through 902*n* may be specifically programmed with one or more application programs in accordance with one or more principles/methodologies detailed herein. In some embodiments, member computing devices 902*a* through 902*n* may operate on any operating system capable of supporting a browser or browser-enabled application, such as Microsoft™ Windows™, and/or Linux. In some embodiments, member computing devices 902*a* through 902*n* shown may include, for example, personal computers executing a browser application program such as Microsoft Corporation's Internet Explorer™, Apple Computer, Inc.'s Safari™, Mozilla Firefox, Google Chrome, and/or Opera. In some embodiments, through the member computing client devices 902*a* through 902*n,* user 912*a,* user 912*b* through user 912*n,* may communicate over the exemplary network 906 with each other and/or with other systems and/or devices coupled to the network 906. As shown in FIG. 9, exemplary server devices 904 and 913 may include processor 905 and processor 914, respectively, as well as memory 917 and memory 916, respectively. In some embodiments, the server devices 904 and 913 may be also coupled to the network 906. In some embodiments, one or more member computing devices 902*a* through 902*n* may be mobile clients.

In some embodiments, at least one database of exemplary databases 907 and 915 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
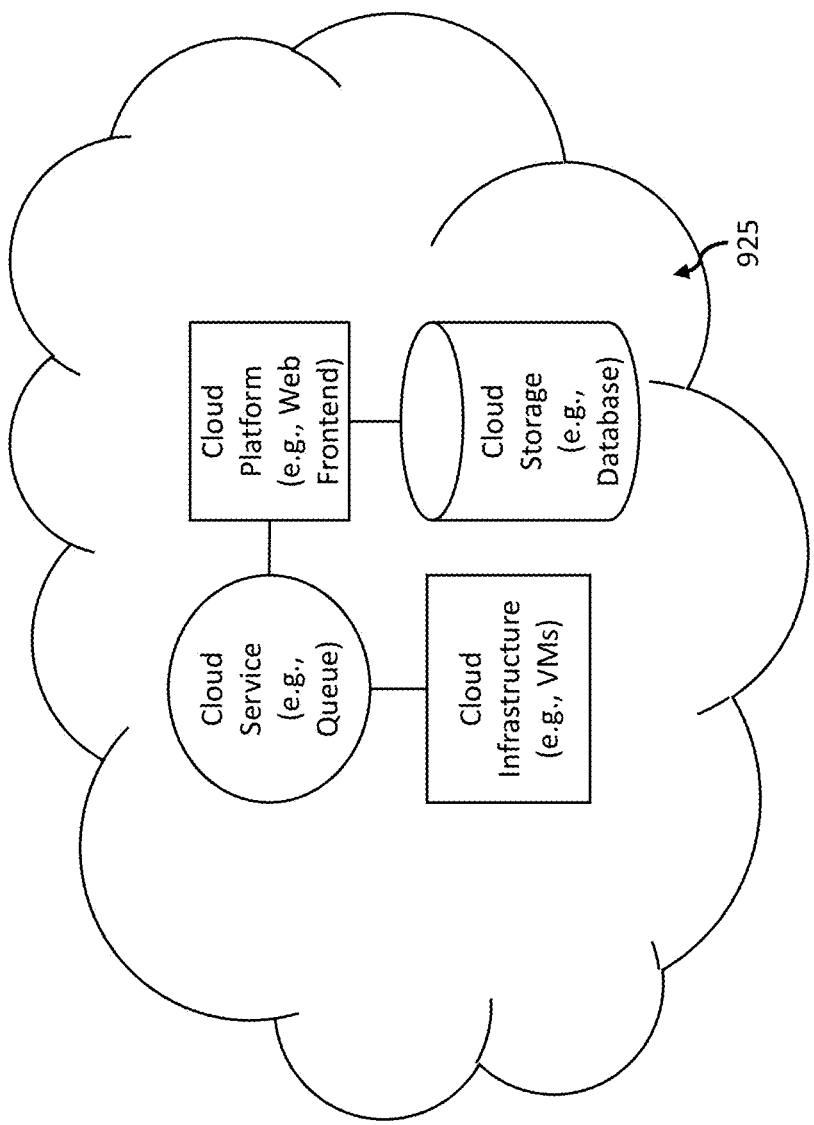
FIG. 10 illustrates schematics of an exemplary implementation of the cloud computing/architecture(s) in which the computer-based system and platform for producing an interactive attuned discrete avatar may be specifically configured to operate in accordance with one or more embodiments of the present disclosure.
Figure 11:
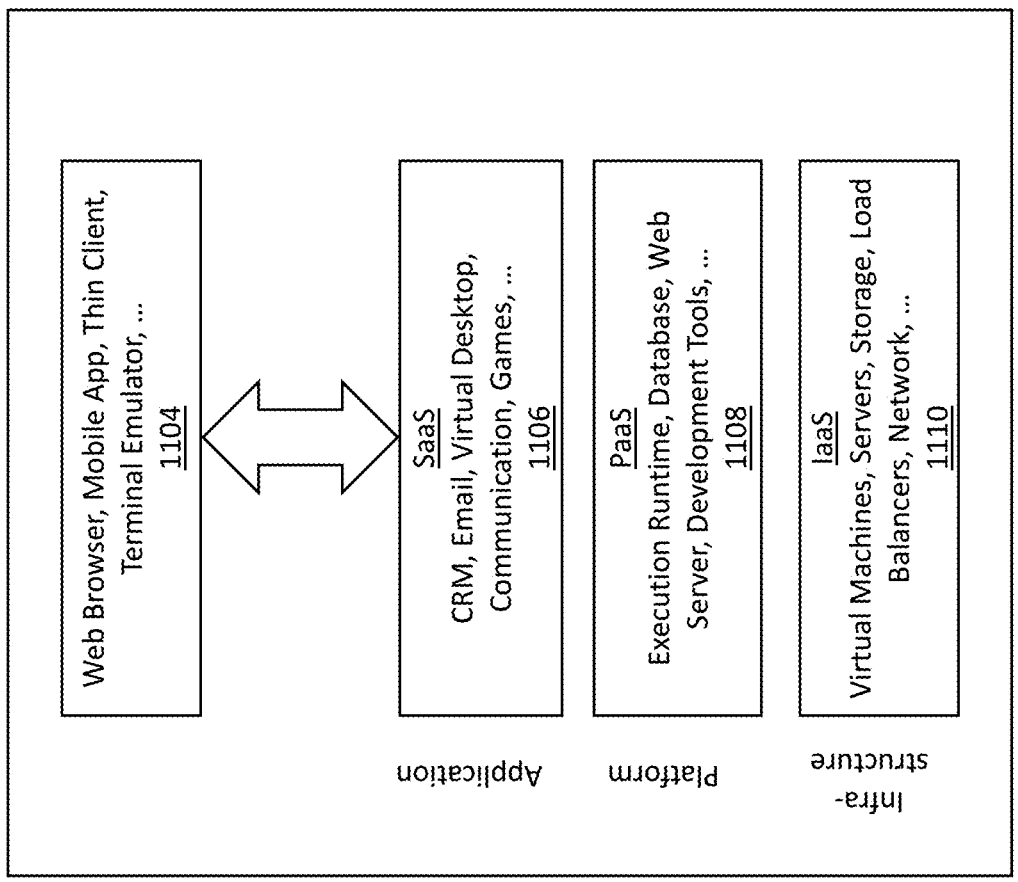
FIG. 11 illustrates schematics of another exemplary implementation of the cloud computing/architecture(s) in which the computer-based system and platform for producing an interactive attuned discrete avatar may be specifically configured to operate in accordance with one or more embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 925 such as, but not limiting to: infrastructure a service (IaaS) 1110, platform as a service (PaaS) 1108, and/or software as a service (SaaS) 1106 using a web browser, mobile app, thin client, terminal emulator or other endpoint 1104. FIGS. 10 and 11 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk(TM), TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH),WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
receiving, by a processor, audio-visual input stream of user communications of a user via an audio-visual input device;
  wherein the audio-visual input stream comprises audio-visual input data across a period of time;
determining, by the processor, vocal characteristics of acoustic data of the audio-visual input data based at least in part on at least one of wavelengths, frequencies or amplitudes of the acoustic data;
determining, by the processor, at least one time-varying acoustic emotion metric throughout the period of time based at least in part on the vocal characteristics;
utilizing, by the processor, at least one speech recognition model to recognize speech data of the audio-visual input stream;
utilizing, by the processor, at least one natural language understanding model to produce speech recognition data indicative of meaning, intent and sentiment;
determining, by the processor, at least one time-varying speech emotion metric throughout the period of time based at least in part on the speech recognition data;
utilizing, by the processor, at least one facial emotion recognition model to produce facial action units representative of recognizes facial features represented in the audio-visual input stream;
determining, by the processor, at least one facial emotional state based at least in part on the facial action units and a facial action coding system;
determining, by the processor, at least one time-varying facial emotion metric throughout the period of time based at least in part on the at least one facial emotional state;
determining, by the processor, at least one time-varying aggregate emotion metric throughout the period of time based at least in part on the at least one time-varying acoustic emotion metric, the at least one time-varying speech emotion metric and the at least one time-varying facial emotion metric;
determining, by the processor, an emotional complex signature for the period of time based at least in part on the at least one time-varying aggregate emotion metric; and
rendering, via a display, by the processor, an interactive attuned discrete avatar in response to the emotional Complex signature for the period of time.

2. The method of claim 1, further comprising:
determining, by the processor, attuned facial action units attuned to the emotional Complex signature;
generating, by the processor, a photorealistic computer-generated face based at least in part on the attuned facial action units; and
rendering, via the display, by the processor, the interactive attuned discrete avatar using the photorealistic computer-generated face.

3. The method of claim 2, further comprising:
determining, by the processor, attuned computer-generated speech based at least in part on the emotional Complex signature;
determining, by the processor, attuned vocal qualities based at least in part on the vocal characteristics of the acoustic data;
determining, by the processor, a synchronization of the photorealistic computer-generated face and the attuned computer-generated speech based at least in part on the attuned vocal characteristics; and
rendering, via the display, by the processor, the interactive attuned discrete avatar using the photorealistic computer-generated face, the attuned computer-generated speech and the synchronization of the photorealistic computer-generated face and the attuned computer-generated speech in response to the audio-visual input stream.

4. The method of claim 1, wherein the vocal characteristics include at least one of pitch, loudness, shimmer, jitter, speech rate, harmonics or prosody characteristics.

5. The method of claim 1, wherein the facial action coding system comprises Paul Ekman's Facial Action Coding System.

6. The method of claim 1, wherein the at least one facial recognition model comprises:
a gaze recognition and recording model to recognize and record eye gaze of the user;
a turn taking model to recognize a communication turn indicative of a turn to communicate; and
a pupil dilation model to determine pupil dilation of the user.

7. The method of claim 1, further comprising:
accessing, by the processor, a memory module that stores previous emotional Complex signatures associated with user reactions;
determining, by the processor, the attuned facial action units attuned to the emotional Complex signature and the previous emotional Complex signatures;
determining, by the processor, the attuned computer-generated speech based at least in part on the emotional Complex signature and the previous emotional Complex signatures; and
determining, by the processor, the attuned vocal characteristics based at least in part on the vocal characteristics of the acoustic data and the previous emotional Complex signatures.

8. The method of claim 1, further comprising:
tagging, by the processor, a high amplitude-high confidence interaction where the emotional Complex signature exceeds a predetermined threshold;
storing, by the processor, the high amplitude-high confidence interaction in a long-term memory module; and
determining, by the processor, at least one the attuned facial action units, the attuned computer-generated speech, or the attuned vocal characteristics based at least in part on the high amplitude-high confidence interaction.

9. A system comprising:
at least one processor; and
at least one non-transitory computer readable medium storing software instructions, wherein the at least one processor, upon execution of the software instructions, is configured to:
receive audio-visual input stream of user communications of a user via an audio-visual input device;
wherein the audio-visual input stream comprises audio-visual input data across a period of time;
determine vocal characteristics of acoustic data of the audio-visual input data based at least in part on at least one of wavelengths, frequencies or amplitudes of the acoustic data;
determine at least one time-varying acoustic emotion metric throughout the period of time based at least in part on the vocal characteristics;
utilize at least one speech recognition model to recognize speech data of the audio-visual input stream;
utilize at least one natural language understanding model to produce speech recognition data indicative of meaning, intent and sentiment;
determine at least one time-varying speech emotion metric throughout the period of time based at least in part on the speech recognition data;
utilize at least one facial emotion recognition model to produce facial action units representative of recognizes facial features represented in the audio-visual input stream;
determine at least one facial emotional state based at least in part on the facial action units and a facial action coding system;
determine at least one time-varying facial emotion metric throughout the period of time based at least in part on the at least one facial emotional state;
determine at least one time-varying aggregate emotion metric throughout the period of time based at least in part on the at least one time-varying acoustic emotion metric, the at least one time-varying speech emotion metric and the at least one time-varying facial emotion metric;
determine an emotional complex signature for the period of time based at least in part on the at least one time-varying aggregate emotion metric; and
render, via a display, an interactive attuned discrete avatar in response to the emotional Complex signature for the period of time.

10. The system of claim 9, wherein the at least one processor, upon execution of the software instructions, is further configured to:
determine attuned facial action units attuned to the emotional Complex signature;
generate a photorealistic computer-generated face based at least in part on the attuned facial action units; and
render, via the display, the interactive attuned discrete avatar using the photorealistic computer-generated face.

11. The system of claim 10, wherein the at least one processor, upon execution of the software instructions, is further configured to:
determine attuned computer-generated speech based at least in part on the emotional Complex signature;
determine attuned vocal qualities based at least in part on the vocal characteristics of the acoustic data;
determine a synchronization of the photorealistic computer-generated face and the attuned computer-generated speech based at least in part on the attuned vocal characteristics; and
render, via the display, the interactive attuned discrete avatar using the photorealistic computer-generated face, the attuned computer-generated speech and the synchronization of the photorealistic computer-generated face and the attuned computer-generated speech in response to the audio-visual input stream.

12. The system of claim 9, wherein the vocal characteristics include at least one of pitch, loudness, shimmer, jitter, speech rate, harmonics or prosody characteristics.

13. The system of claim 9, wherein the facial action coding system comprises Paul Ekman's Facial Action Coding System.

14. The system of claim 9, wherein the at least one facial recognition model comprises:
a gaze recognition and recording model to recognize and record eye gaze of the user;
a turn taking model to recognize a communication turn indicative of a turn to communicate; and
a pupil dilation model to determine pupil dilation of the user.

15. The system of claim 9, wherein the at least one processor, upon execution of the software instructions, is further configured to:
access a memory module that stores previous emotional Complex signatures associated with user reactions;
determine the attuned facial action units attuned to the emotional Complex signature and the previous emotional Complex signatures;
determine the attuned computer-generated speech based at least in part on the emotional Complex signature and the previous emotional Complex signatures; and
determine the attuned vocal characteristics based at least in part on the vocal characteristics of the acoustic data and the previous emotional Complex signatures.

16. The system of claim 9, wherein the at least one processor, upon execution of the software instructions, is further configured to:
tag a high amplitude-high confidence interaction where the emotional Complex signature exceeds a predetermined threshold;
store the high amplitude-high confidence interaction in a long-term memory module; and
determine at least one the attuned facial action units, the attuned computer-generated speech, or the attuned vocal characteristics based at least in part on the high amplitude-high confidence interaction.

17. A non-transitory computer readable medium having software instructions stored thereon, the software instructions configured to cause at least one processor to perform steps comprising:
receiving audio-visual input stream of user communications of a user via an audio-visual input device;
wherein the audio-visual input stream comprises audio-visual input data across a period of time;
determining vocal characteristics of acoustic data of the audio-visual input data based at least in part on at least one of wavelengths, frequencies or amplitudes of the acoustic data;
determining at least one time-varying acoustic emotion metric throughout the period of time based at least in part on the vocal characteristics;
utilizing at least one speech recognition model to recognize speech data of the audio-visual input stream;

utilizing at least one natural language understanding model to produce speech recognition data indicative of meaning, intent and sentiment;

determining at least one time-varying speech emotion metric throughout the period of time based at least in part on the speech recognition data;

utilizing at least one facial emotion recognition model to produce facial action units representative of recognizes facial features represented in the audio-visual input stream;

determining at least one facial emotional state based at least in part on the facial action units and a facial action coding system;

determining at least one time-varying facial emotion metric throughout the period of time based at least in part on the at least one facial emotional state;

determining at least one time-varying aggregate emotion metric throughout the period of time based at least in part on the at least one time-varying acoustic emotion metric, the at least one time-varying speech emotion metric and the at least one time-varying facial emotion metric;

determining an emotional complex signature for the period of time based at least in part on the at least one time-varying aggregate emotion metric; and rendering, via a display an interactive attuned discrete avatar in response to the emotional Complex signature for the period of time.

18. The non-transitory computer readable medium of claim 17, wherein the software instructions are further configured to cause the at least one processor to perform steps comprising:

determining attuned facial action units attuned to the emotional Complex signature;

generating a photorealistic computer-generated face based at least in part on the attuned facial action units; and rendering, via the display the interactive attuned discrete avatar using the photorealistic computer-generated face.

19. The non-transitory computer readable medium of claim 18, wherein the software instructions are further configured to cause the at least one processor to perform steps comprising:

determining attuned computer-generated speech based at least in part on the emotional Complex signature;

determining attuned vocal qualities based at least in part on the vocal characteristics of the acoustic data;

determining a synchronization of the photorealistic computer-generated face and the attuned computer-generated speech based at least in part on the attuned vocal characteristics; and rendering, via the display the interactive attuned discrete avatar using the photorealistic computer-generated face, the attuned computer-generated speech and the synchronization of the photorealistic computer-generated face and the attuned computer-generated speech in response to the audio-visual input stream.

20. The non-transitory computer readable medium of claim 17, wherein the software instructions are further configured to cause the at least one processor to perform steps comprising:

accessing a memory module that stores previous emotional Complex signatures associated with user reactions;

determining the attuned facial action units attuned to the emotional Complex signature and the previous emotional Complex signatures;

determining the attuned computer-generated speech based at least in part on the emotional Complex signature and the previous emotional Complex signatures; and determining the attuned vocal characteristics based at least in part on the vocal characteristics of the acoustic data and the previous emotional Complex signatures.

* * * * *